(12) United States Patent
Willis

(10) Patent No.: US 10,189,418 B2
(45) Date of Patent: Jan. 29, 2019

(54) ADJUSTABLE AND SLIDING LADDER RACK APPARATUS

(71) Applicant: Adrian Steel Company, Adrian, MI (US)

(72) Inventor: Thomas M. Willis, Petersburg, MI (US)

(73) Assignee: Adrian Steel Company, Adrian, MI (US)

( * ) Notice: Subject to any disclaimer, the term of this patent is extended or adjusted under 35 U.S.C. 154(b) by 82 days.

(21) Appl. No.: 15/444,540

(22) Filed: Feb. 28, 2017

(65) Prior Publication Data

US 2018/0244208 A1    Aug. 30, 2018

(51) Int. Cl.
*B60R 9/00* (2006.01)
*B60R 9/042* (2006.01)

(52) U.S. Cl.
CPC ................... *B60R 9/0423* (2013.01)

(58) Field of Classification Search
CPC .. B60R 9/00; B60R 9/06; B60R 9/042; B60R 9/0423; E06C 5/00
USPC .......................................................... 224/310
See application file for complete search history.

(56) References Cited

U.S. PATENT DOCUMENTS

| | | | | |
|---|---|---|---|---|
| 3,963,136 A | * | 6/1976 | Spanke | B60R 9/0423 224/310 |
| 4,808,056 A | * | 2/1989 | Oshima | B60P 1/4414 414/462 |
| 5,058,791 A | * | 10/1991 | Henriquez | B60R 9/0423 224/310 |
| 5,297,912 A | * | 3/1994 | Levi | B60R 9/0423 414/462 |
| 5,398,778 A | * | 3/1995 | Sexton | B60R 9/0423 182/127 |
| 5,850,891 A | * | 12/1998 | Olms | B60R 9/0423 182/127 |
| 6,092,972 A | * | 7/2000 | Levi | B60R 9/0423 224/310 |

(Continued)

*Primary Examiner* — Brian D Nash
(74) *Attorney, Agent, or Firm* — Marshall & Melborn, LLC

(57) ABSTRACT

A vehicle equipment rack having a first cross member and a second cross member. A first roller coupled with an outboard end of the first cross member. A second roller coupled with an outboard end of the second cross member. A first arm in rolling engagement with the first roller. A second arm in rolling engagement with the second roller. A drive tube rotatably coupled with the first and second cross members. A first pivot arm coupled with the drive tube, the first pivot arm rotatably coupled with the first arm. A second pivot arm coupled with the drive tube, the second pivot arm rotatably coupled with the second arm. The first arm including a base member. The base member having an aperture disposed through a surface thereof. A first linear actuator disposed in the base member, wherein a portion of the first linear actuator is disposed through the base member aperture. A first bracket disposed on a surface of the base member. The first bracket coupled with the first linear actuator. A sliding member slideably coupled with the base member. A second bracket coupled with the sliding member. The second arm including a third bracket disposed on a surface of the second arm, and a fourth bracket coupled with the second arm.

14 Claims, 22 Drawing Sheets

(56) References Cited

U.S. PATENT DOCUMENTS

| | | | | |
|---|---|---|---|---|
| 6,179,543 | B1* | 1/2001 | Adame | B60R 9/0423 224/310 |
| 6,315,181 | B1 | 11/2001 | Bradley et al. | |
| 6,764,268 | B2* | 7/2004 | Levi | B60R 9/0423 224/310 |
| 6,854,627 | B2* | 2/2005 | Foo | B60R 9/048 182/127 |
| 7,097,409 | B2 | 8/2006 | Richter | |
| 7,549,831 | B2* | 6/2009 | Hendley | B60R 9/0423 224/310 |
| 7,992,682 | B2* | 8/2011 | Ziaylek | E06C 5/06 182/127 |
| 8,033,777 | B2* | 10/2011 | Janecek | B60P 3/40 414/546 |
| 8,974,160 | B2 | 3/2015 | Bender | |
| 9,132,780 | B2 | 9/2015 | Sautter, Jr. et al. | |
| 9,327,654 | B2* | 5/2016 | Richter | B60R 9/0423 |
| 9,415,726 | B2* | 8/2016 | Levi | B60R 9/0423 |
| 9,796,340 | B2* | 10/2017 | Bharucha | B60R 9/0485 |
| 9,987,995 | B2* | 6/2018 | Paunov | B60R 9/0423 |
| 2004/0026472 | A1* | 2/2004 | Foo | B60R 9/042 224/310 |
| 2006/0185933 | A1* | 8/2006 | Thibault | B60R 9/0423 182/127 |

* cited by examiner

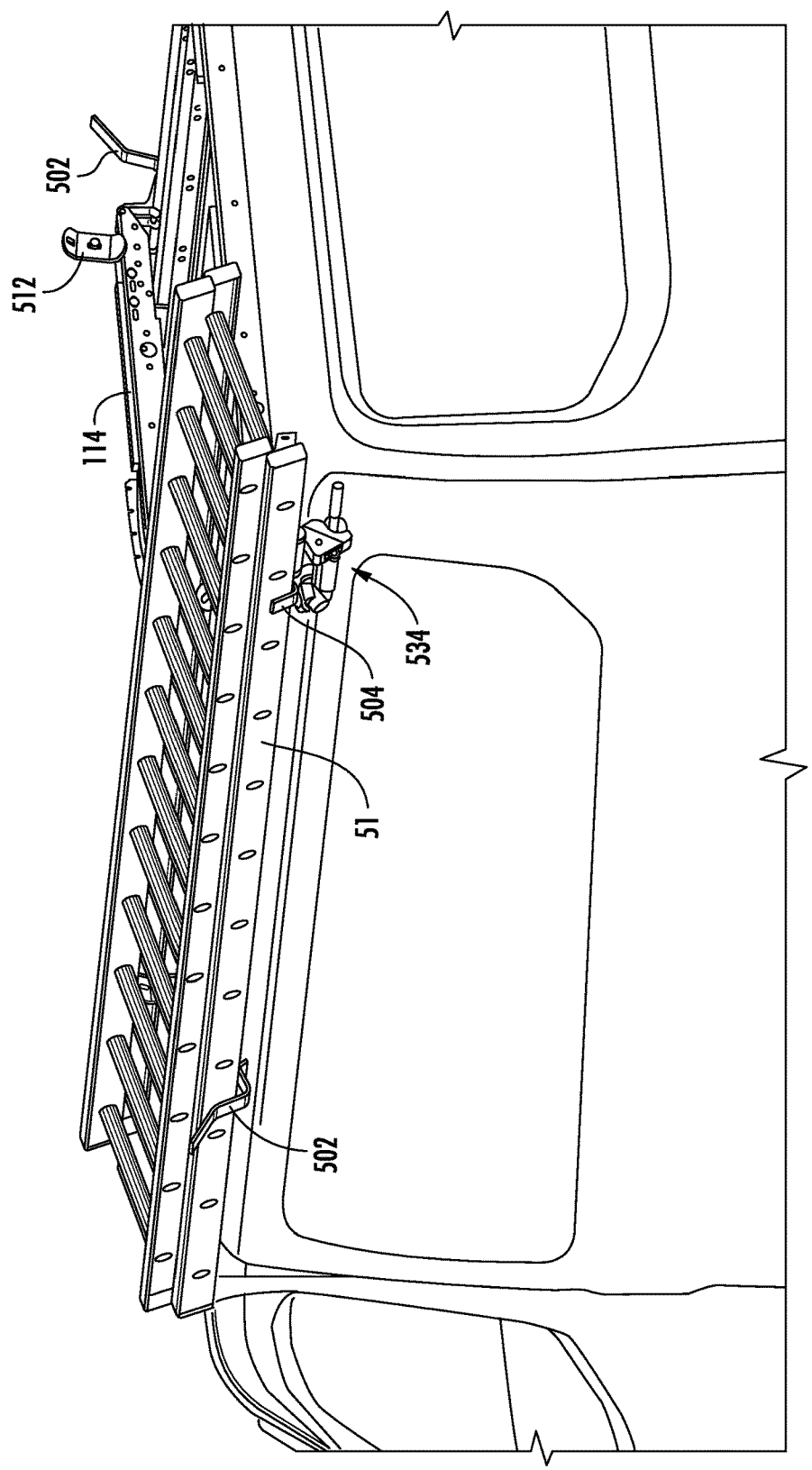

ADJUSTABLE AND SLIDING LADDER RACK APPARATUS

CROSS-REFERENCE TO RELATED APPLICATIONS

This application claims the benefit of U.S. Provisional Patent Application No. 62/301,565 filed on Feb. 29, 2016, which is herein incorporated by reference in its entirety.

BACKGROUND

The present disclosure relates to an apparatus that may be utilized to load, secure, and unload ladders onto/from vehicles.

Ladders and other large pieces of equipment are often transported by motor vehicle via an apparatus coupled with the roof and/or body of the motor vehicle. Ladders and other large pieces of equipment may be heavy and cumbersome. The unaided loading and unloading of ladders and other large pieces of equipment onto a vehicle requires the lifting and manipulation of the equipment. Such lifting and manipulation of ladders and other equipment may result in the exertion or injury of the persons performing the loading and unloading. In addition, the unaided loading and unloading of ladders and other large pieces of equipment may result in damage to vehicles and equipment.

Thus, there is a need for a vehicle ladder rack apparatus which may be utilized to aid in the loading, securing, and unloading of ladders and other large pieces of equipment to onto and off-of vehicles.

SUMMARY

The present disclosure provides for a first embodiment of a vehicle equipment rack having a first cross member and second cross member. A first roller coupled with an outboard end of the first cross member. A second roller coupled with an outboard end of the second cross member. A first arm in rolling engagement with the first roller. A second arm in rolling engagement with the second roller. A drive tube rotatably coupled with the first and second cross members. A first pivot arm coupled with the drive tube, the first pivot arm rotatably coupled with the first arm. A second pivot arm coupled with the drive tube, the second pivot arm rotatably coupled with the second arm. The first arm including a base member. The base member having an aperture disposed through a surface thereof. A first linear actuator disposed in the base member, wherein a portion of the first linear actuator is disposed through the base member aperture. A first bracket disposed on a surface of the base member. The first bracket coupled with the first linear actuator. A sliding member slideably coupled with the base member. A second bracket coupled with the sliding member. The second arm including a third bracket disposed on a surface of the second arm, and a fourth bracket coupled with the second arm.

The present disclosure also provides for a second embodiment of a vehicle equipment rack having a first cross member and second cross member. A first ladder support coupled with an end of the first cross member. A second ladder support coupled with an end of the second cross member. A first bracket coupled with the first cross member, wherein the first bracket is disposed inboard of the first ladder support. A support shaft coupled with the first ladder support and the second ladder support. A handle assembly rotatably coupled with the support shaft and the second cross member. A second bracket coupled with the handle assembly, wherein rotation of the handle assembly rotates the second bracket.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

FIG. 25 illustrates the ladder rack apparatus of FIG. 15 that may be attached to a vehicle and having a ladder loaded and secured thereto.

DETAILED DESCRIPTION OF EMBODIMENTS

Figure 1:
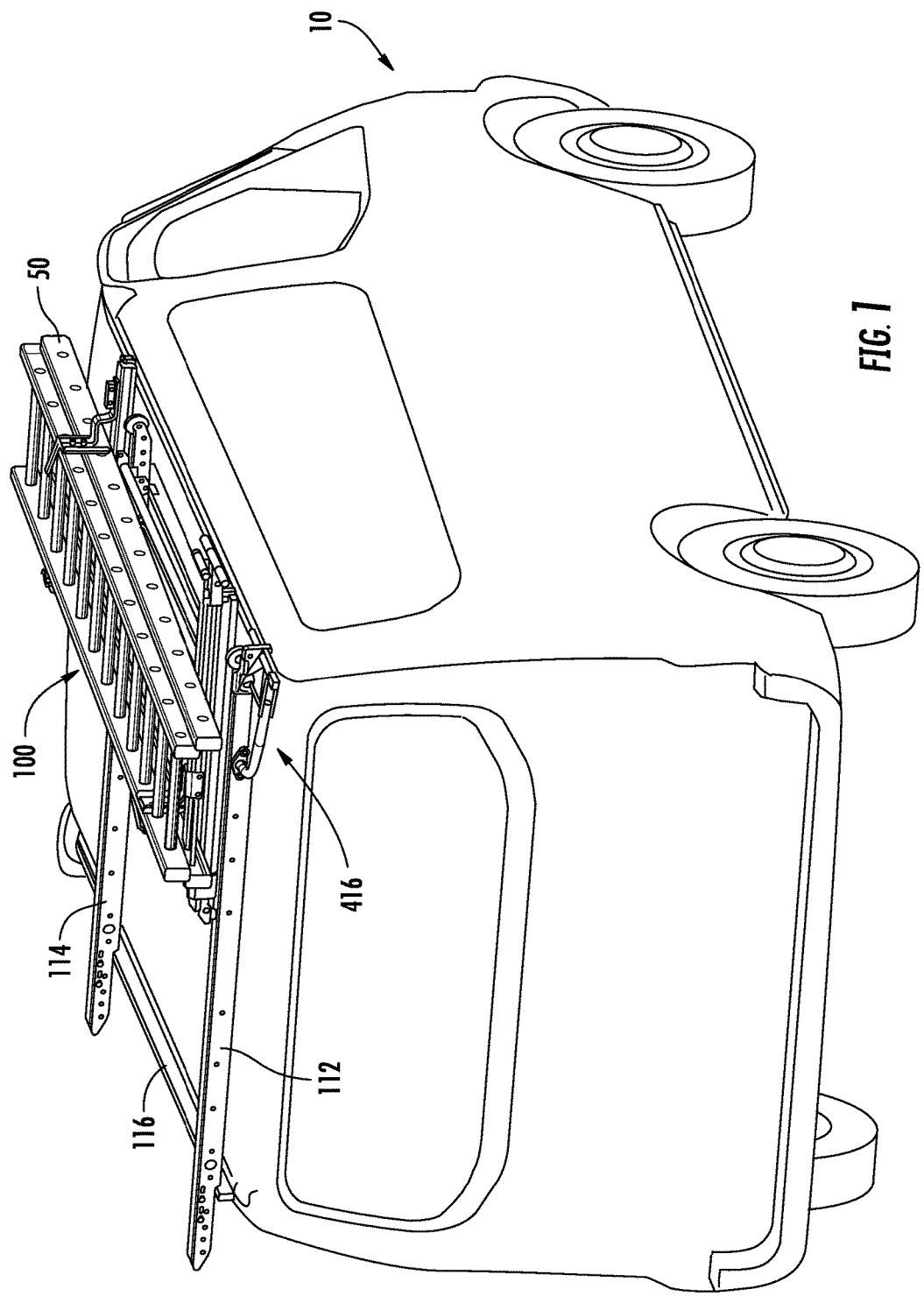
FIG. 1 illustrates a ladder rack apparatus that may be attached to a vehicle and having a ladder loaded and secured thereto according to an embodiment of the presently disclosed subject matter.

It is to be understood that the invention may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Certain embodiments of a ladder rack apparatus 100 are utilized with a vehicle 10 as illustrated in FIG. 1. However, the ladder rack apparatus 100 is not limited to use with the vehicle 10 depicted and described herein. The ladder rack apparatus 100 may be utilized with vehicles including, but not limited to, covered vehicles, trucks, pick-up trucks, flatbed trucks, station wagons, and firetrucks.

Figure 5:
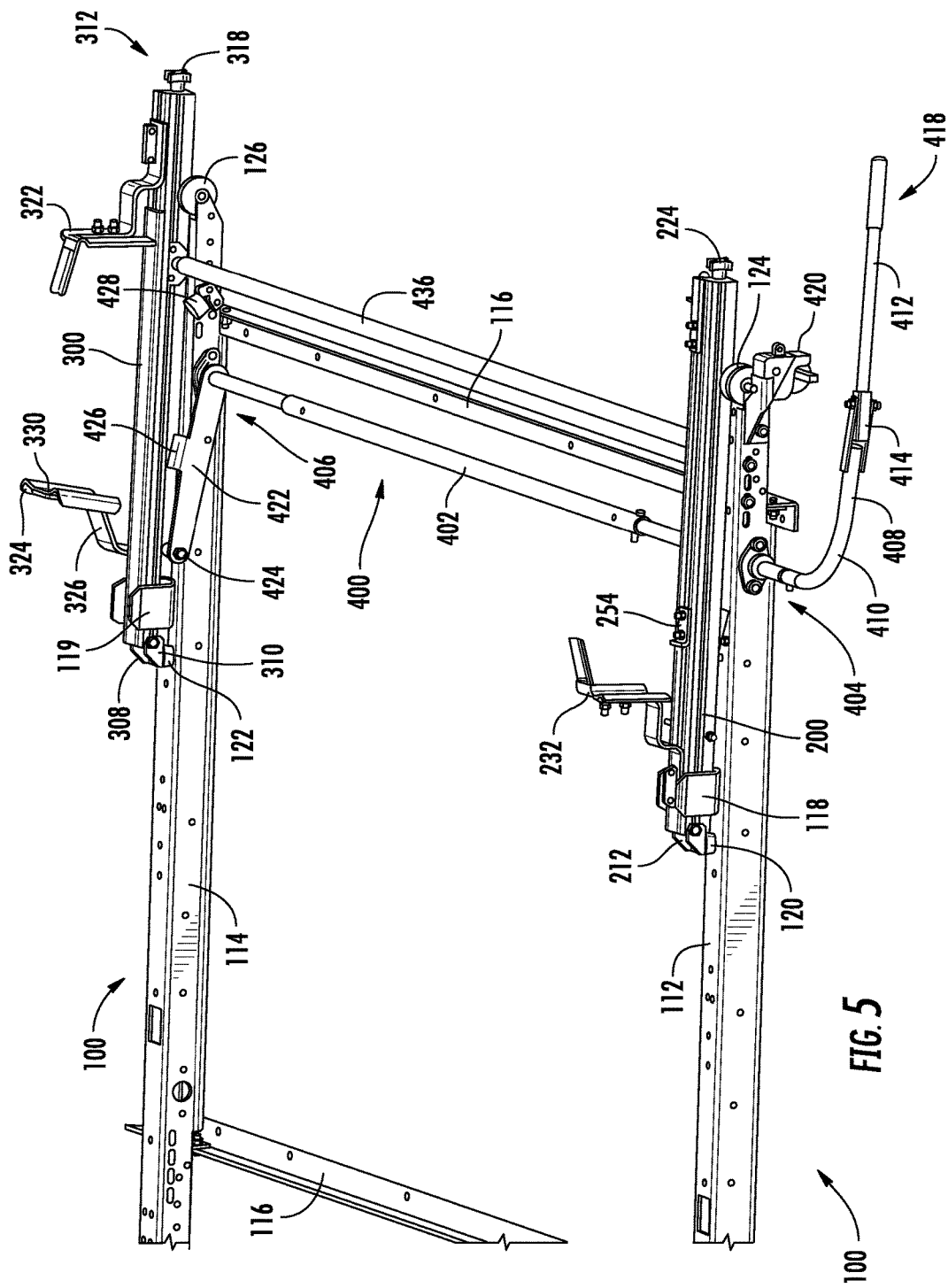
FIG. 5 illustrates a portion of the ladder rack apparatus of FIG. 1.

As illustrated in FIG. 5, in an embodiment, the ladder rack apparatus 100 includes a frame assembly 110. The frame assembly 110 comprises first and second cross members 112, 114 which are mountable to the vehicle 10 via a pair of rails 116. In an embodiment, the rails 116 have an elongate geometry and an L-shaped cross section. The rails 116 are coupled with the roof of the vehicle 10 parallel to a longitudinal axis of the vehicle 10 via mechanical fasteners. In an embodiment, the rails 116 may be coupled with the roof of the vehicle 10 via welding. In another embodiment (not depicted), the first and second cross members 112, 114 may be coupled with the vehicle 10 utilizing brackets, or any conventional means known in the art. The cross members 112, 114 extend across the roof of the vehicle 10 transverse the longitudinal axis of the vehicle 10 and the rails 116. A person having skill in the relevant art will recognize that in other embodiments (not depicted), various numbers of cross members may be mounted to the vehicle 10, on the roof or other portions of the vehicle 10.

Figure 2:
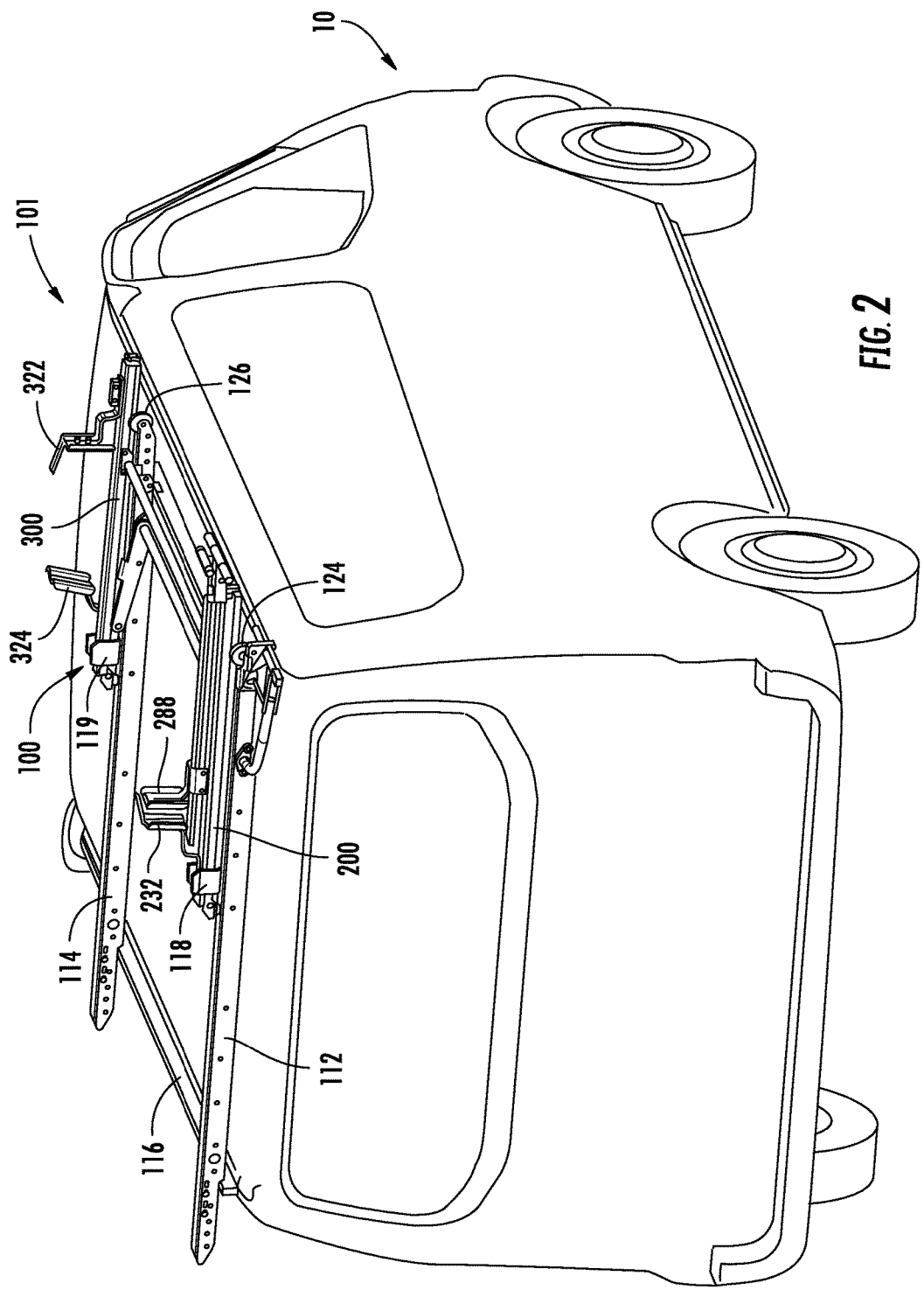
FIG. 2 illustrates the ladder rack apparatus of FIG. 1 in a first position, coupled with a covered vehicle.
Figure 3:
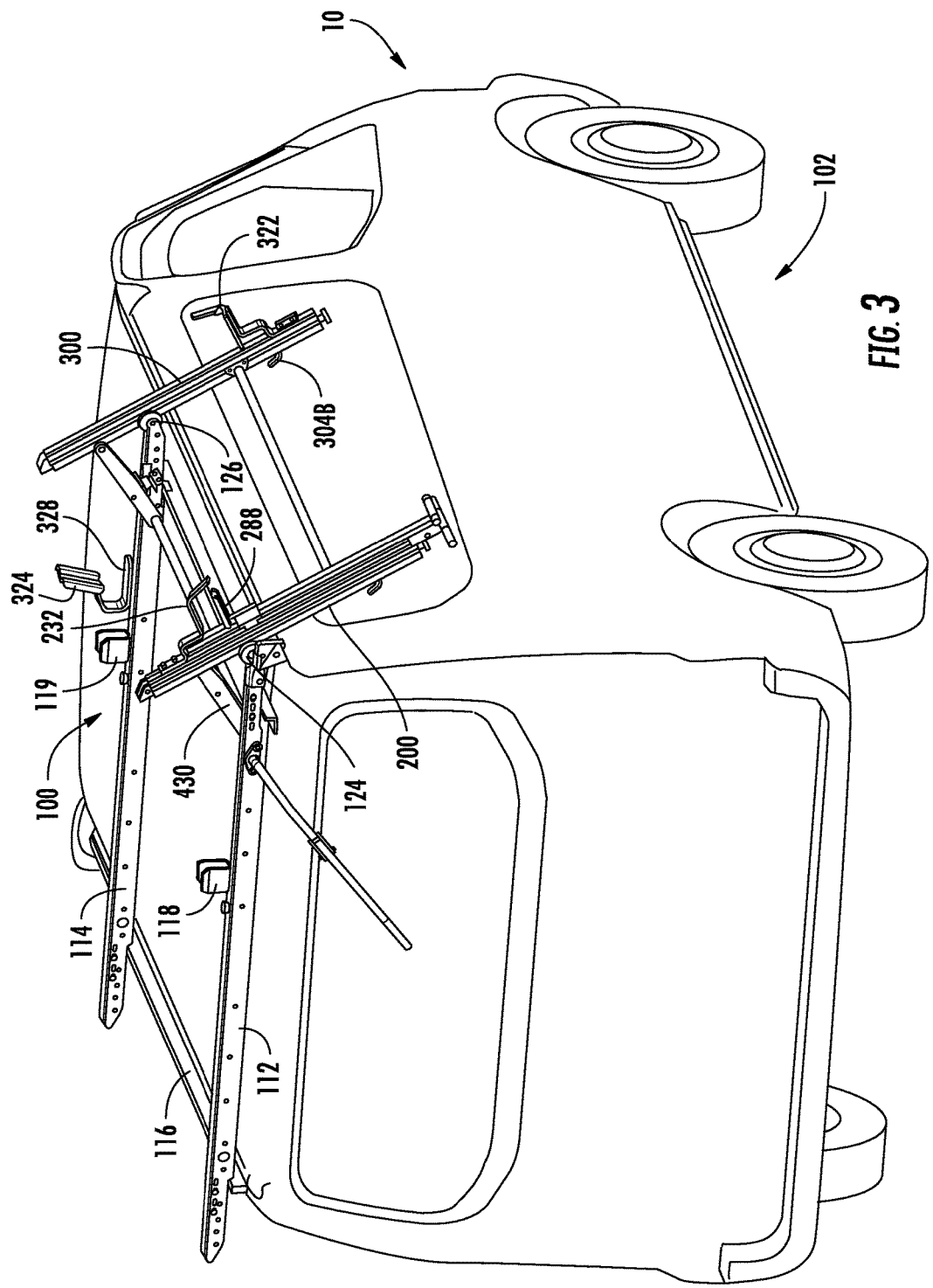
FIG. 3 illustrates the ladder rack apparatus of FIG. 1 in a second position with respect to the vehicle in FIG. 1.
Figure 4:
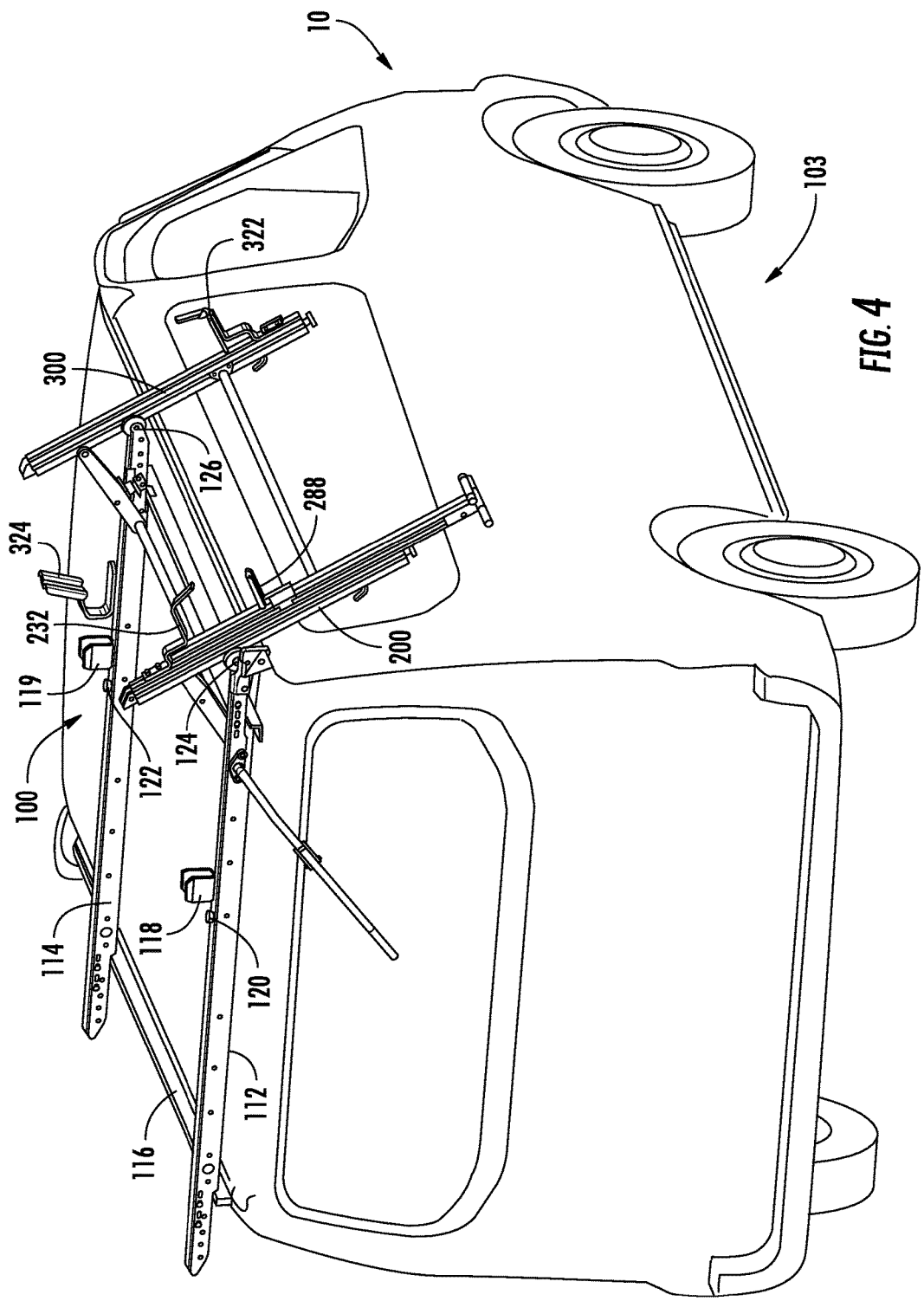
FIG. 4 illustrates the ladder rack apparatus of FIG. 1 in a third position with respect to the covered vehicle in FIG. 1.

Now referring to FIGS. 3-5, in an embodiment, a "U-shaped" bracket 118 is coupled with the top of the first cross member 112. In an embodiment, the bracket 118 includes two side walls, each having an outwardly-flaring top-end. The bracket 118 may be formed unitarily or comprise multiple components. When a first arm 200 of the ladder rack apparatus 100 is disposed in a first position 101 (see FIG. 2), the bracket 118 elastically deforms to receive the first arm 200. The bracket 118 limits the lateral movement of the first arm 200 while the ladder rack apparatus is in the first position 101. The bracket 118 also militates against vertical movement of the first arm 200 via friction and/or mechanical interaction between the bracket 118 and the first arm 200. In an embodiment, a second bracket 119, substantially similar to the bracket 118, is coupled with the top of the second cross member 114.

Additionally, a first first-position positive stop 120 may be disposed on a top surface of the first cross member 112 adjacent to the bracket 118. A second first-position positive stop 122 may also be disposed on a top surface of the second cross member 114. In an embodiment, the first-position positive stops 120, 122 may comprise a polymeric material.

Disposed at a first end of the first cross member 112 is a first guide roller 124. Disposed at a first end of the second cross member 114 is a second guide roller 126. The guide rollers 124, 126 are located at least partially within the ends of the first and second cross members 112, 114, respectively. The guide rollers 124, 126 may each rotate on a respective support pin 128 located through the first and second cross members 112, 114. The guide rollers 124, 126 support the first and second arms 200, 300.

Figure 6:
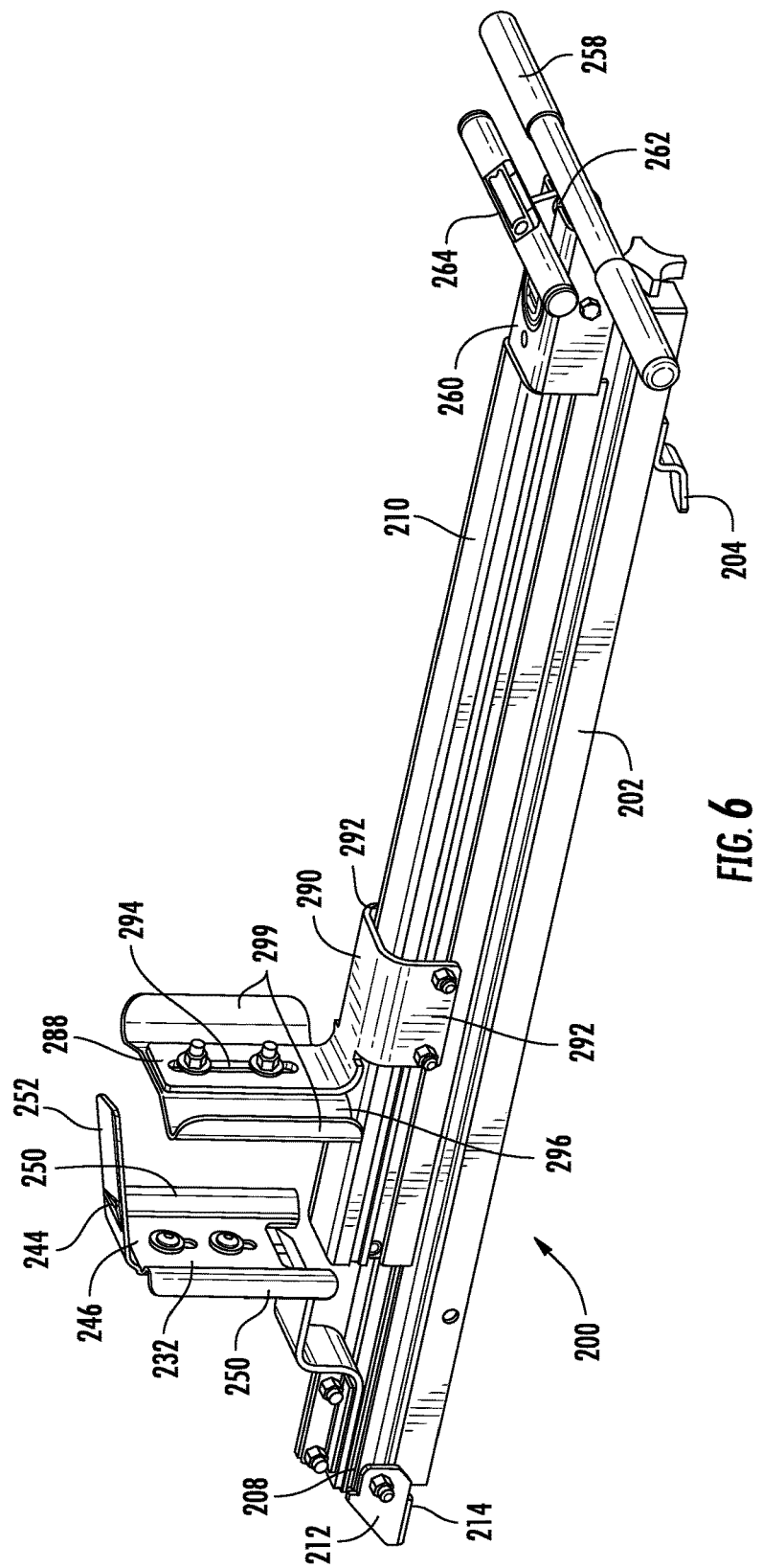
FIG. 6 illustrates an arm of the ladder rack apparatus of FIG. 1.
Figure 7:
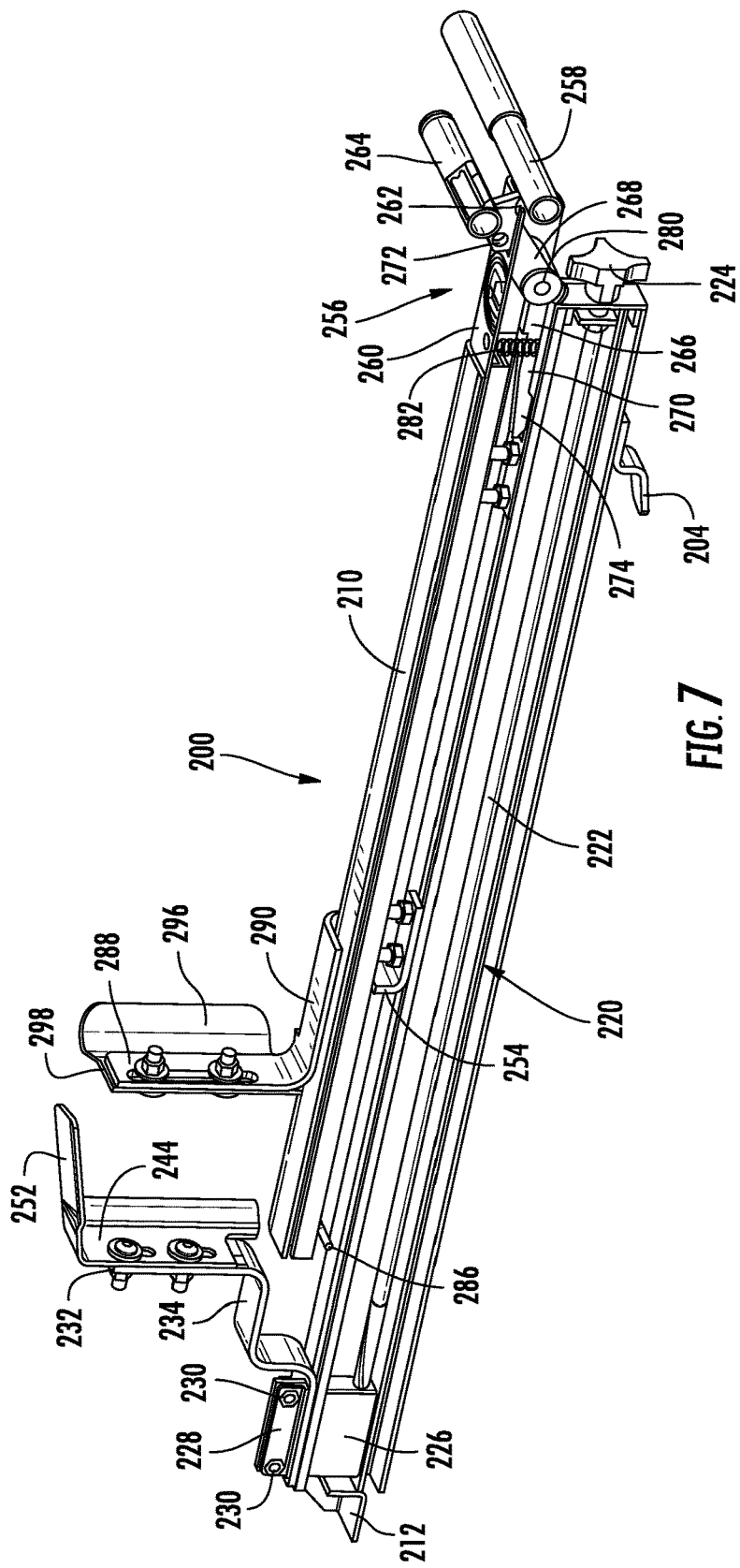
FIG. 7 illustrates a cross section of an arm of the ladder rack apparatus of FIG. 1.
Figure 11:
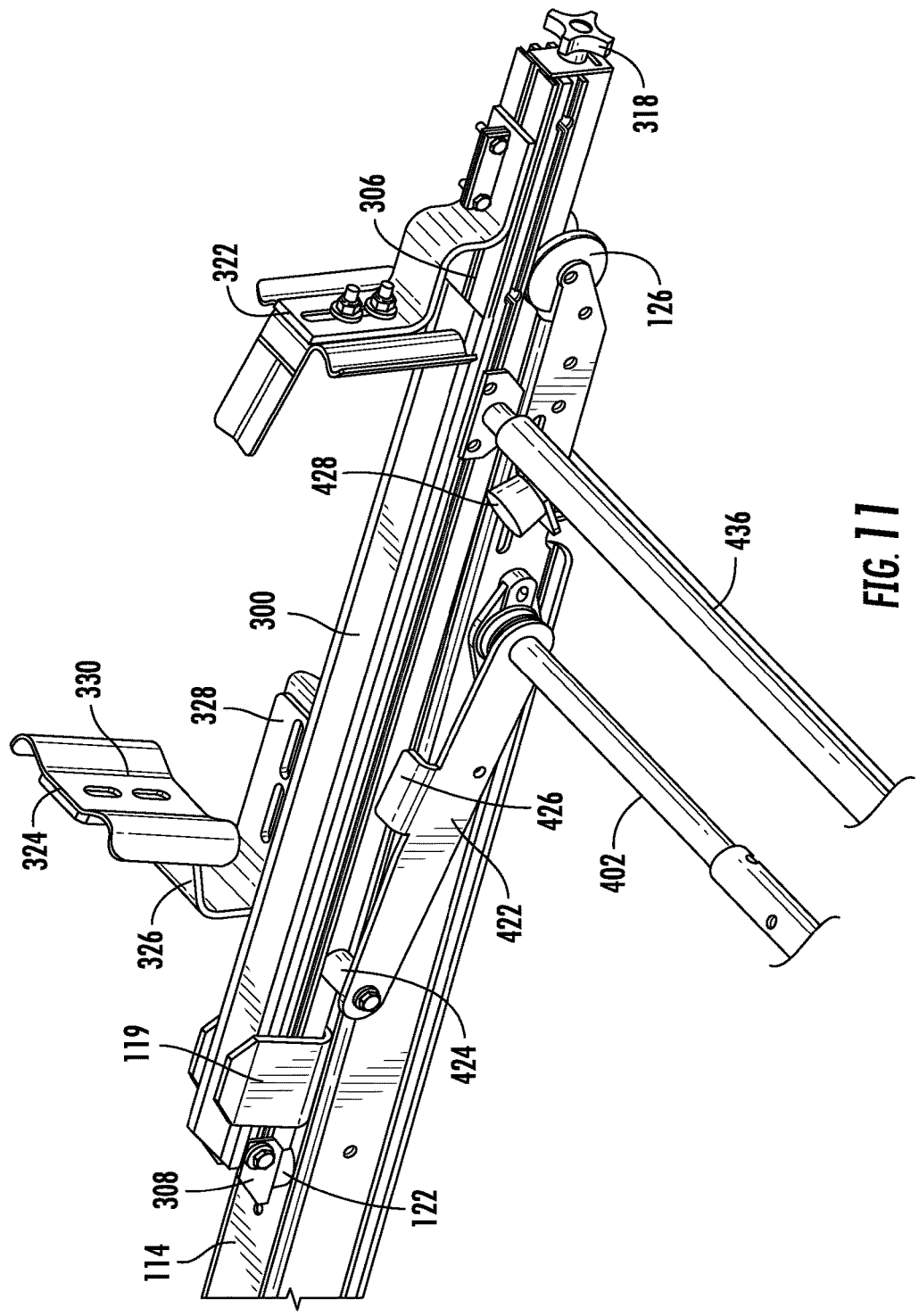
FIG. 11 illustrates another arm of the ladder rack apparatus of FIG. 1.
Figure 12:
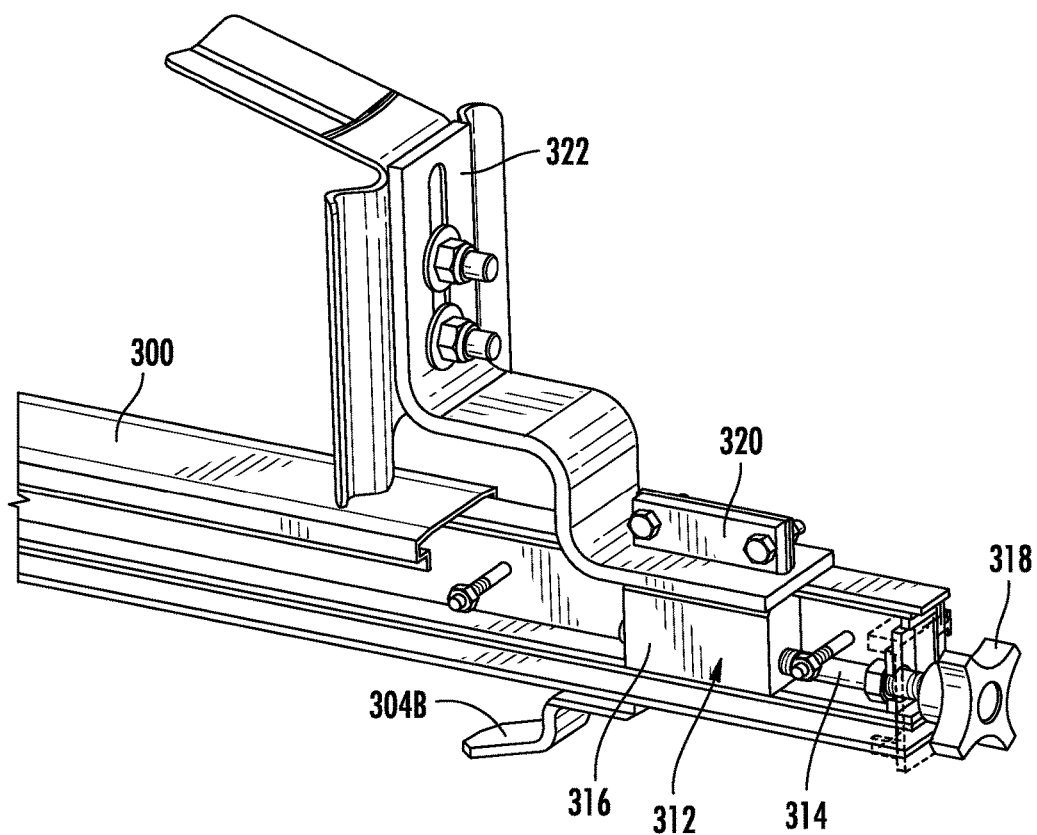
FIG. 12 illustrates a cross section of an arm of the ladder rack apparatus of FIG. 1.
Figure 13:
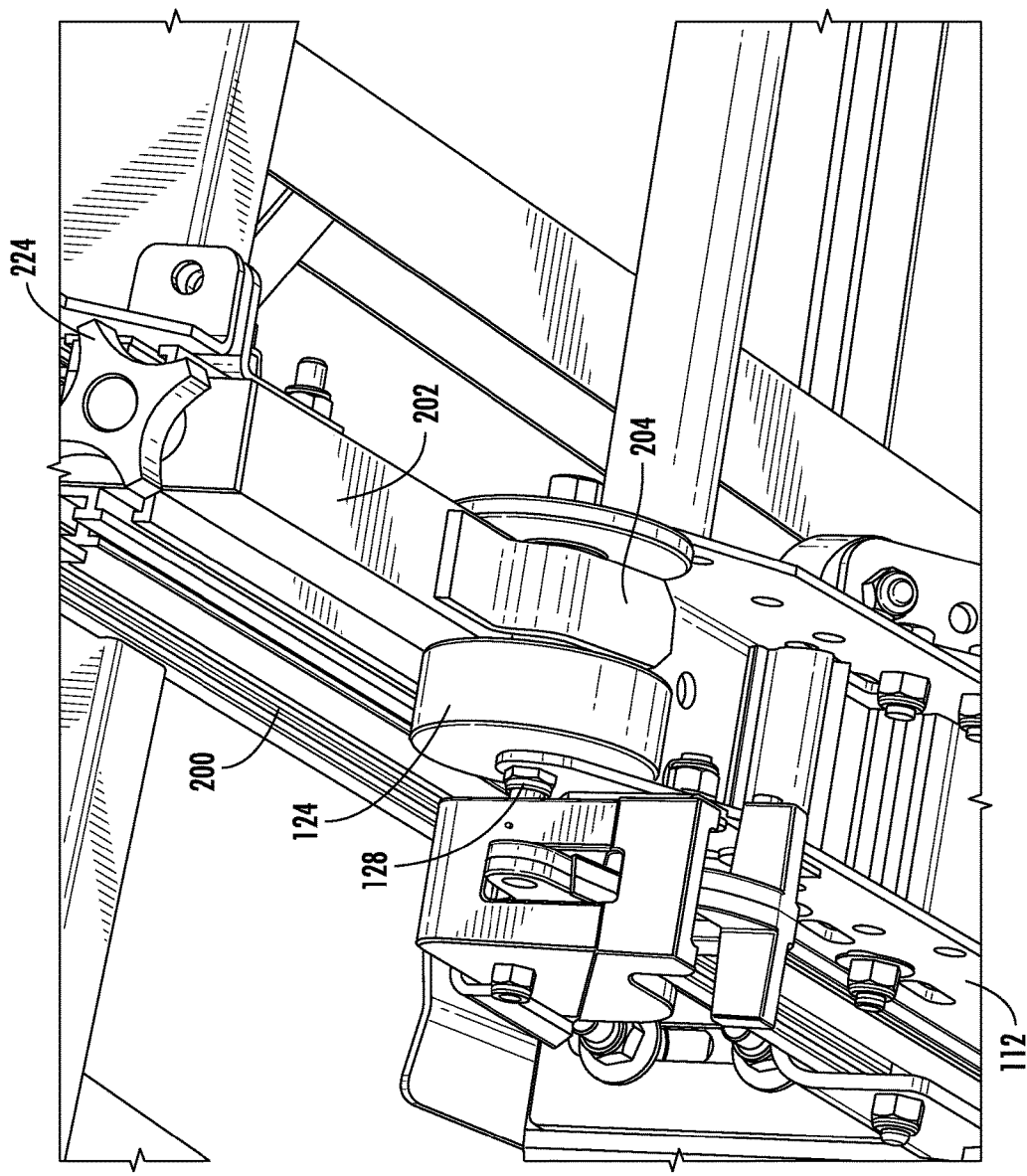
FIG. 13 illustrates a portion of the ladder rack apparatus of FIG. 1 in a second position.
Figure 14:
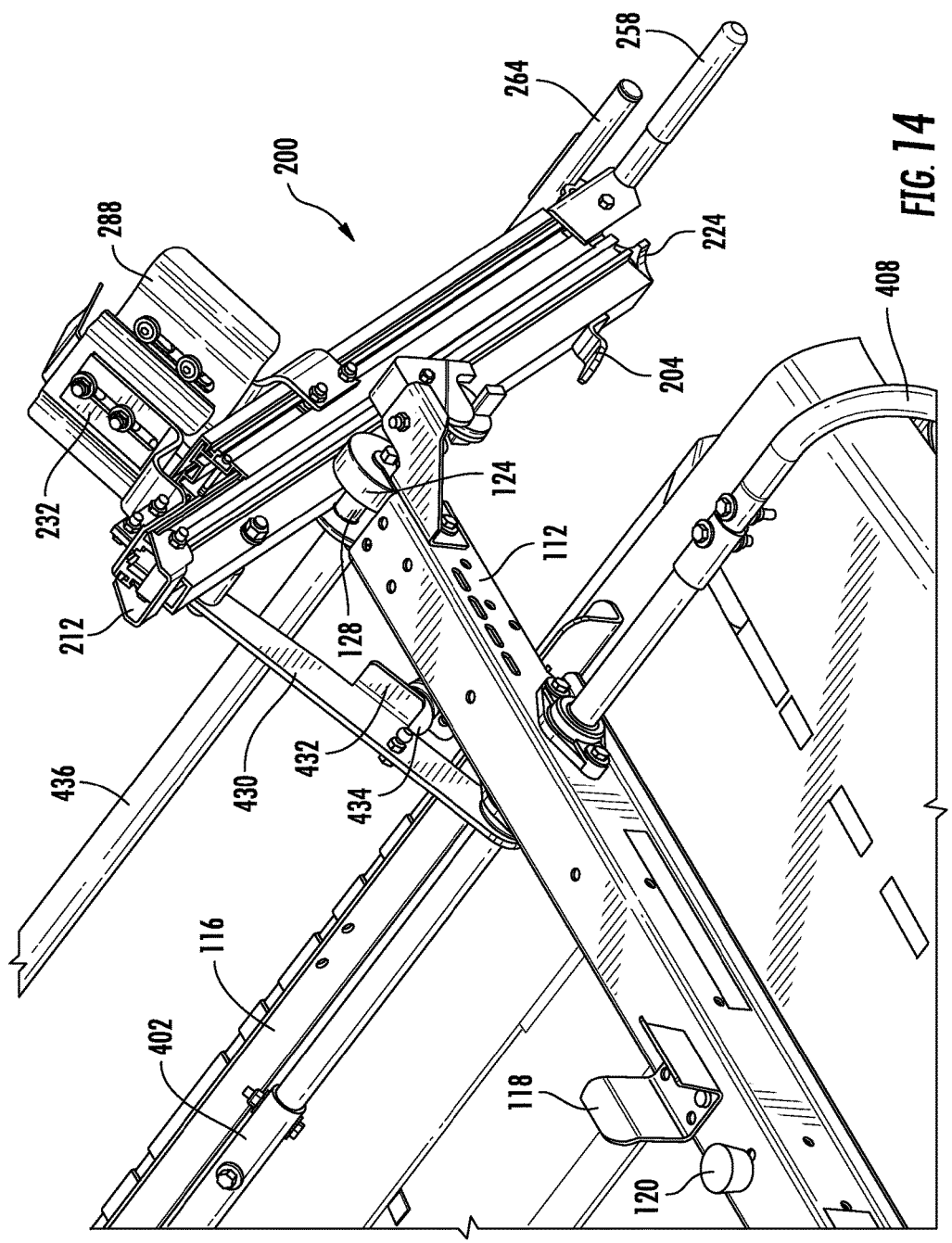
FIG. 14 illustrates a portion of the ladder rack apparatus of FIG. 1 in a first position.
Figure 15:
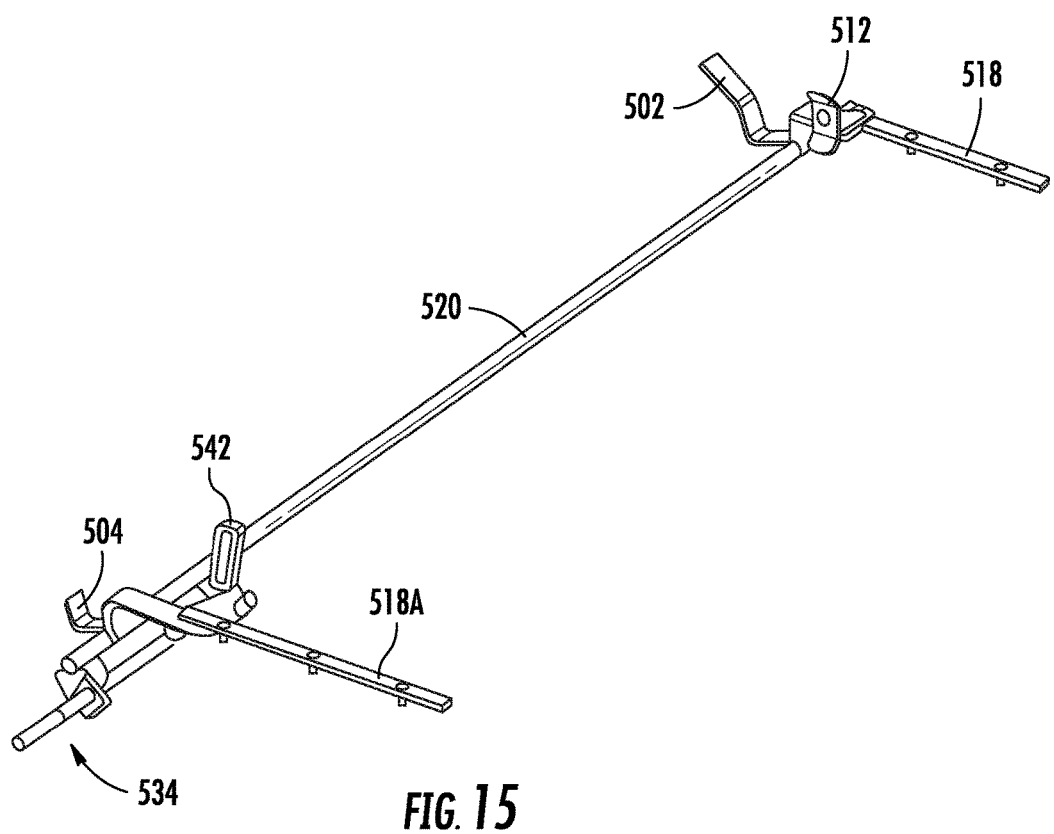
FIG. 15 illustrates a ladder rack apparatus according to another embodiment of the presently disclosed subject matter.
Figure 16:
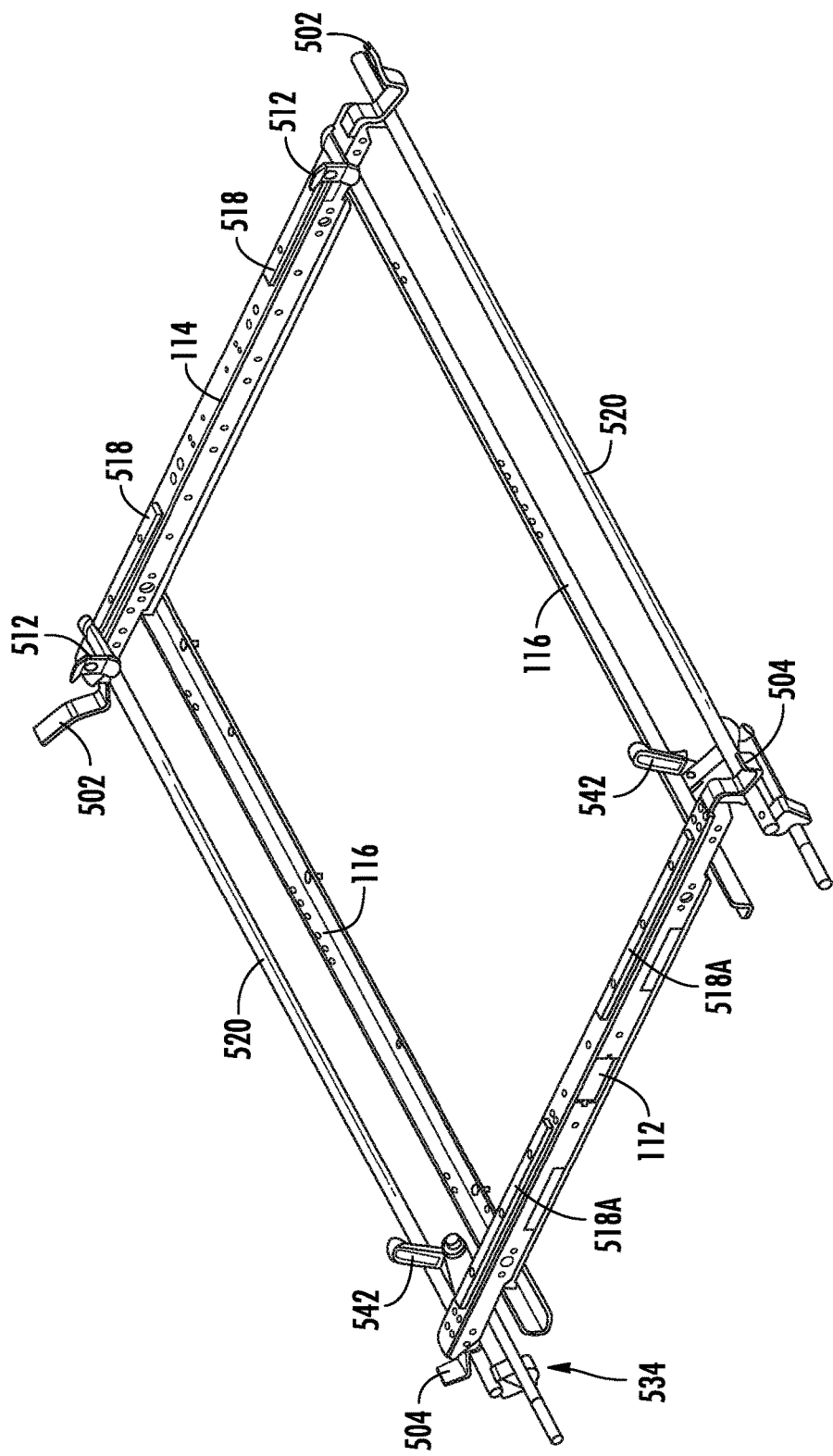
FIG. 16 illustrates two of the ladder rack apparatuses of FIG. 15 mounted to a frame assembly.
Figure 17:
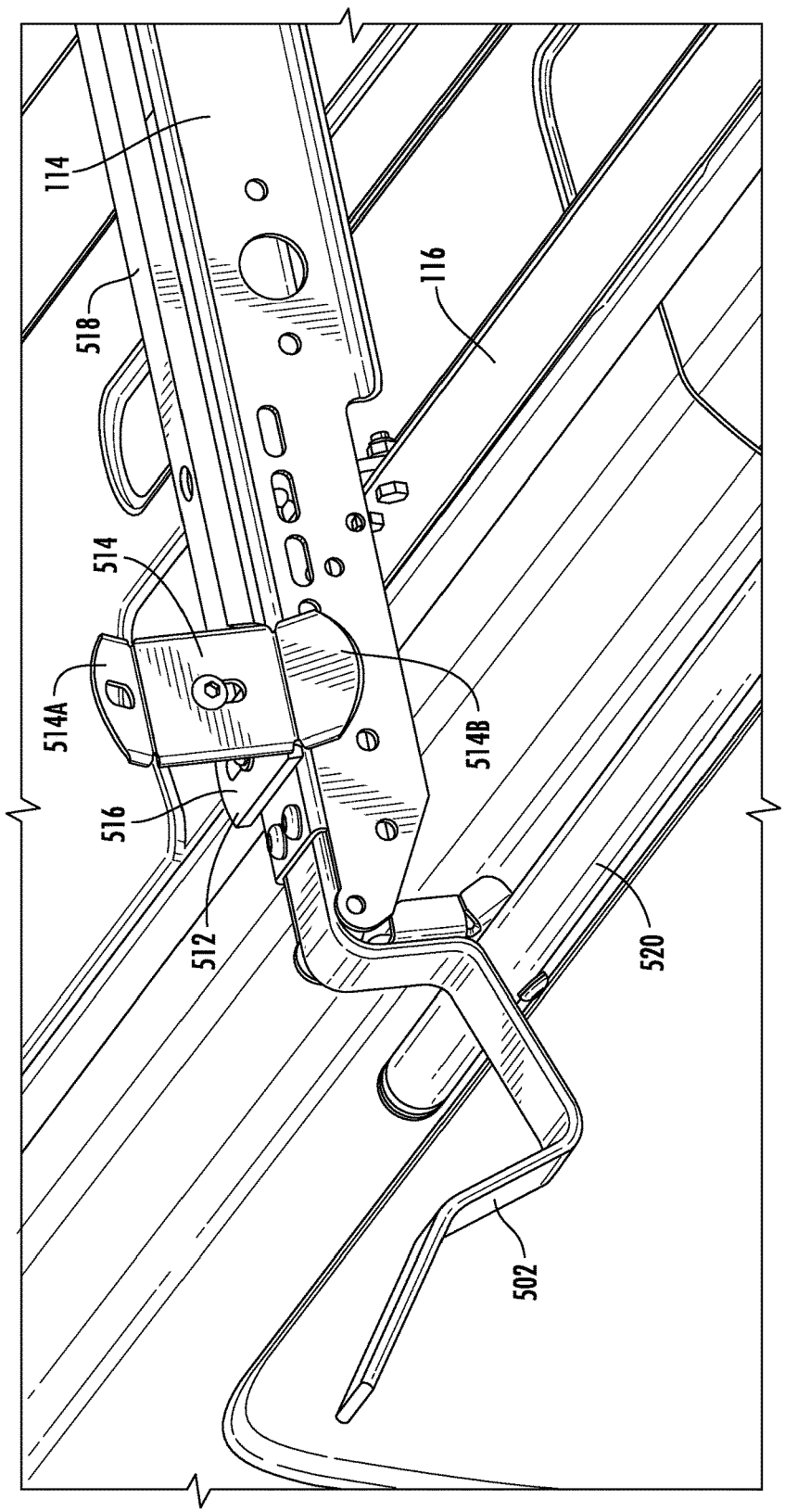
FIG. 17 illustrates a portion of the ladder rack apparatus of FIG. 15.

As illustrated in FIGS. 5-14, the ladder rack apparatus 100 includes the first arm 200. The first arm 200 comprises a base member 202 non-fixedly mounted on top of, and generally parallel to, the first cross member 112. As illustrated in FIGS. 6, 7, and 13, the base member 202 includes a secondary positive stop 204 that selectively contacts the support pin 128 of the guide roller 124. When the ladder rack apparatus 100 transitions from a second position 102 to the first position 101, the secondary positive stop 204 slideably engages the guide roller support pin 128. When the ladder rack apparatus 100 transitions from the first position 101 to the second position 102, a stop-flange 432 contacts a second-position positive stop 434 (further described intra). In an embodiment (not depicted), the first arm 200 may comprise an additional secondary positive stop disposed at an end of the first arm 200 opposite the secondary positive stop 204. This additional secondary positive stop slideably engages the guide roller support pin 128 in the first cross member 112 when the ladder rack apparatus 100 transitions from the first position 101 to the second position 102.

Figure 8:
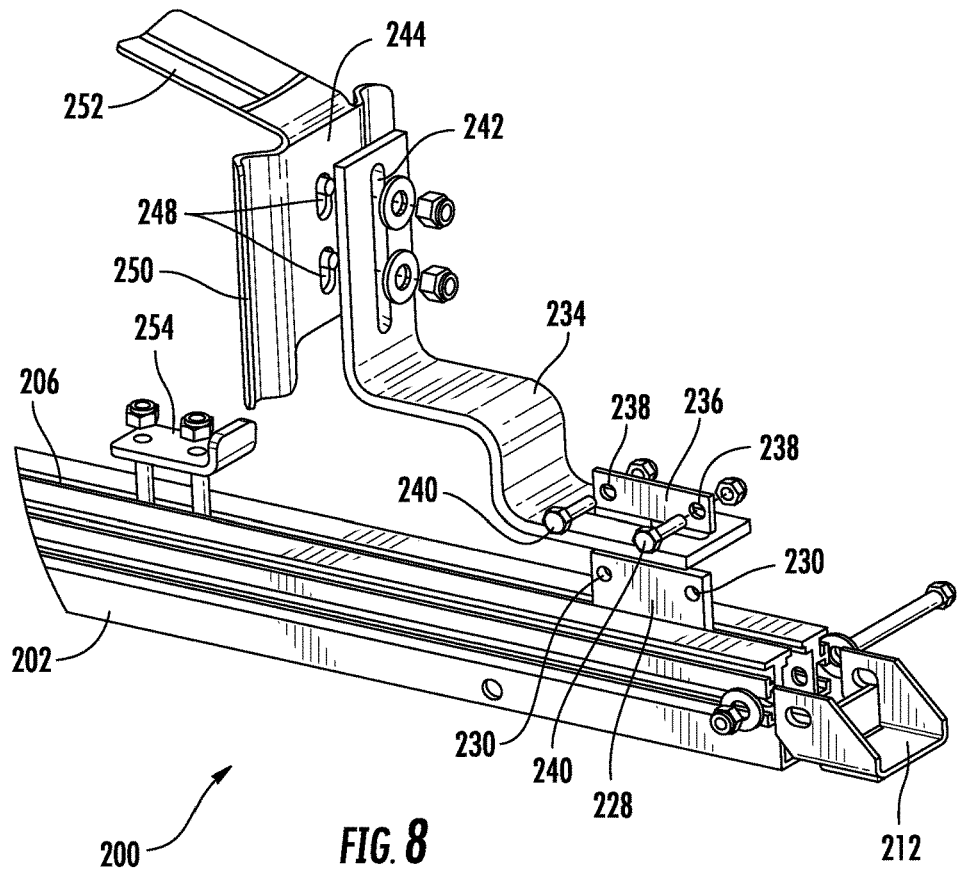
FIG. 8 illustrates a partially exploded view of a portion of an arm of the ladder rack apparatus of FIG. 1.
Figure 9:
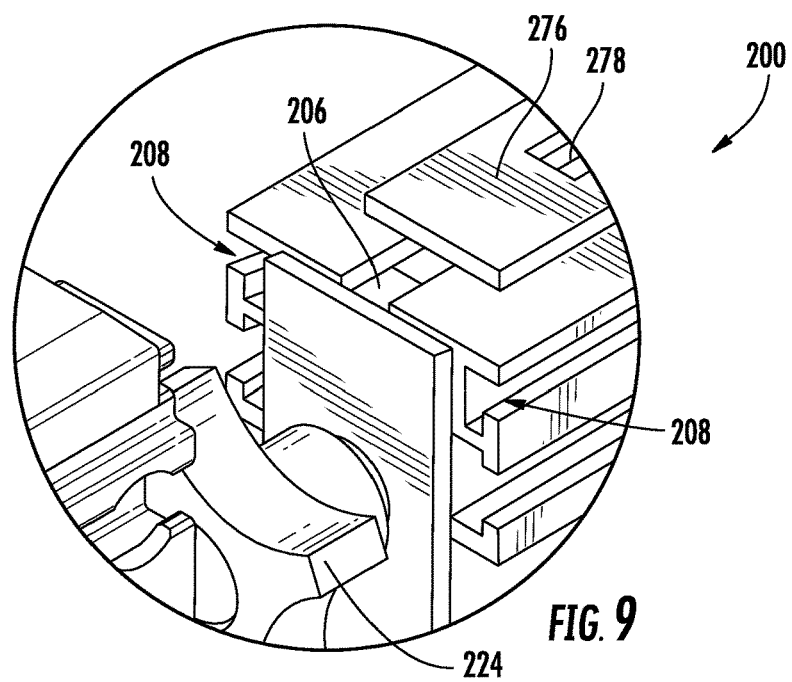
FIG. 9 illustrates a partially exploded view of another portion of an arm of the ladder rack apparatus of FIG. 1.
Figure 10:
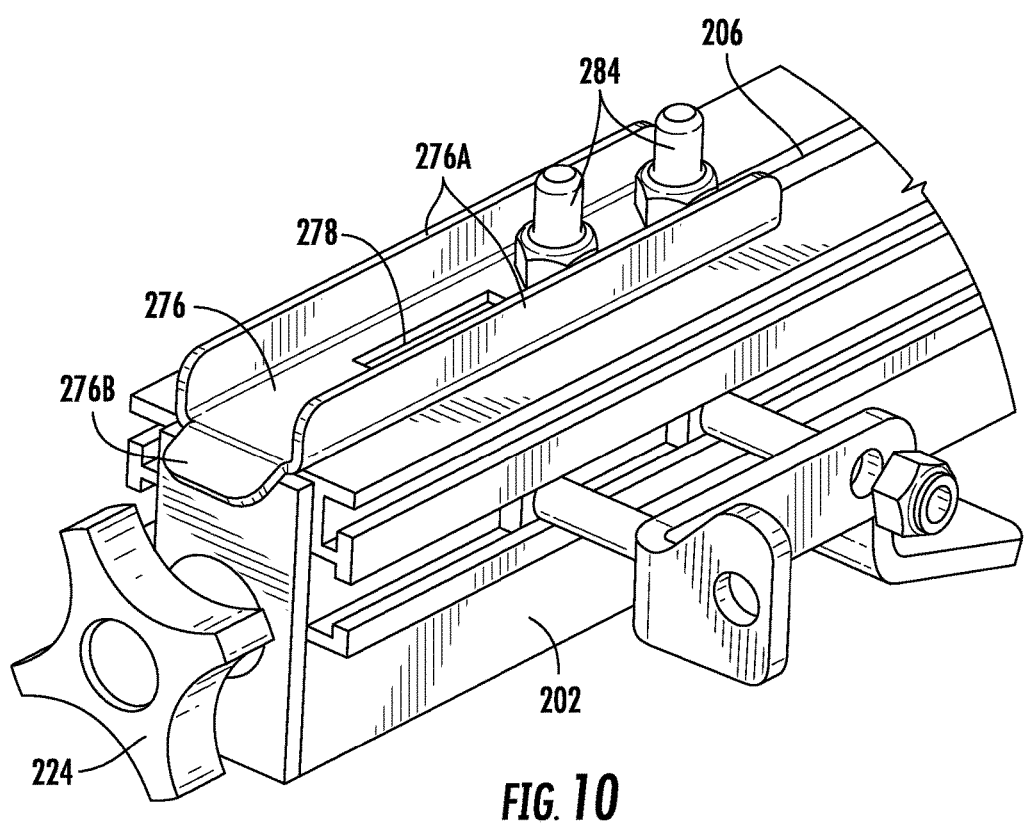
FIG. 10 illustrates a partial view of an arm of the ladder rack apparatus according to another embodiment of the presently disclosed subject matter.

Now referring to FIG. 8, the base member 202 further comprises an elongated aperture 206 disposed through the top thereof. The aperture 206 is disposed substantially parallel with the base member 202 longitudinal axis. As illustrated in FIGS. 8, 9, and 10, the base member 202 additionally comprises bilateral slots 208 disposed in side portions of the base member 202. The bilateral slots 208 are disposed generally parallel with the base member 202 longitudinal axis. The bilateral slots 208 may be utilized to facilitate a sliding engagement with a sliding member 210.

A bumper 212 is coupled with a first end of the base member 202. The bumper 212 contacts the first-position positive stop 120 when the ladder rack apparatus 100 is in a first position 101. In an embodiment, the bumper 212 extends beyond the first end of the base member 202. The bumper 212 may be vertically positioned such that a surface 214 of the bumper 212 is not flush with the bottom surface of the base member 202. The vertical position of the bumper 212 may be utilized to decrease a gap between the first cross member 112 and the first arm 200. In an embodiment, the bumper 212 may be formed unitary and integral with the first arm 200.

Referring now to FIG. 7, a linear actuation assembly 220 is housed in the interior of the base member 202. The linear acutation assembly 220 includes a lead screw 222 rotatably mounted within the base member 202. In an embodiment, the lead screw 222 may comprise a substantially cylindrical geometry having a threaded portion at a first end. In another embodiment (not depicted), the lead screw 222 may be threaded over its entire length. A knob 224 is coupled with a second end of the lead screw 222 for rotation therewith. The knob 224 may be disposed on the exterior of a second end of the base member 202, so that the knob 224 is capable of manual manipulation by an operator without the assistance of additional tools or equipment. As illustrated in FIG. 7, in an embodiment, the linear actuation assembly 220 comprises a nut portion 226. The nut portion 226 comprises internal threads for engaging the threads of the lead screw 222. The nut portion 226 is slideably disposed within the interior of the base member 202. Unitary, or coupled, with the nut portion 226 is a flange portion 228 having a pair of fastener apertures 230. The flange portion 228 is disposed through the base member elongated aperture 206. The flange portion 228 is coupled with a first adjustable bracket 232 via a pair of fasteners disposed through the fastener apertures 230.

The first adjustable bracket 232 comprises a support portion 234. As illustrated in FIG. 8, the support portion 234 includes a flange 236. In an embodiment, the flange 236 includes a pair of fastener apertures 238. The support portion flange 236 may be coupled with the nut portion flange 228 via a pair of fasteners 240 located through the fastener apertures 238. An elongated fastener aperture 242 is disposed through an end of the support portion 234, opposite the flange 236. The elongated fastener aperture 242 permits at least one fastener to be utilized therewith, such that the vertical position of the fastener may be adjusted. In another embodiment (not depicted), the elongated fastener aperture 242 may be replaced with a plurality of fastener apertures which permit vertical adjustment of the at least one fastener.

The first adjustable bracket 232 includes a ladder grip 244 coupled with the support portion 234 via fasteners located through the elongated fastener aperture 242. The ladder grip 244 comprises a base portion 246 having a pair of fastener apertures 248 therethrough for receiving the fasteners disposed through the elongated fastener aperture 242. In an embodiment, as illustrated in FIGS. 6-8, the pair of fastener apertures 248 may be elongated to faciliate greater vertical adjustability of the ladder grip 244 in relation to the first adjustable bracekt support portion 234. Extending from the ladder grip base portion 246 are a pair of lateral extensions 250. As illustrated in FIGS. 6-8, in an embodiment, the lateral extensions 250 may be disposed the entire length of the base portion 246 and have a generall "S"-shaped cross section geometry. However, persons having skill in the relevant arts will recognize that the lateral extensions 250 may comprise a shorter or longer length, and include any cross section geometry providing sufficient structural integrity to the lateral extensions 250 to support a ladder. The first adjustable bracket 232 further includes an extension 252 protruding from an end portion of the ladder grip base portion 246 at an upward angle. The first adjustable bracket extension 252 militates against vertical movement of a ladder secured by the first adjustable bracket 232.

The position of the first adjustable bracket 232 may be changed by an operator rotating the knob 224 in either direction. Changing the position of the first adjustable bracket 232 permits an operator to customize the ladder rack apparatus 100 to specifically fit his/her ladder.

As illustrated in FIG. 7, disposed on the top portion of the base member 202 is a positive stop 254. In an embodiment, the positive stop 254 may comprise an L-shaped member. A portion of the positive stop 254 is fixedly coupled with the base member 202 via a pair of fasteners disposed at least partially within the elongated aperture 206.

The first arm 200 also comprises the sliding member 210 slideably engaged with the base member 202. The sliding member 210 includes bilateral flanges disposed on its lower side, substantially extending the lengh thereof. The bilateral flanges slideably engage the bilateral slots 208 of the base member 202. As illustrated in FIGS. 6 and 7, a latching mechanism 256 is fixedly coupled with the sliding member 210.

The latching mechanism 256 comprises a stationary handle 258 fixedly coupled with a sliding member portion 260. The sliding member portion 260 has a generally "U-shaped" cross section geometry and is fixedly coupled, or formed unitary, with the end of the sliding member 210. An end of the sliding member portion 260 adjacent to the stationary handle 258 includes a slot 262 disposed in its top portion. A release handle 264 is coupled with a latch member 266 which is at least partially located within the slot 262. The latch member 266 comprises a bend defining a first portion 268 and a second portion 270. The first portion 268 of the latch member 266 is coupled with the release handle 264. The latch member first portion 268 is disposed at least partially within the slot 262 and comprises an aperture 272 therethrough. The aperture 272 is located in a portion of the latch member first portion 268 which is disposed above the top of the sliding member portion 260 when the release handle 264 is in a first, resting state/latched, position. A pin, padlock, or other securement device may be inserted into the aperture 272 to prevent undesired disengagement of the latching mechanism 256.

The second portion 270 of the latch member 266 includes a projection 274 that is selectively engaged with a latch plate 276. The latch plate 276 is fixedly coupled with the top of the base member 202 and includes an elongate aperture 278 therethrough. The latch member projection 274 is disposed through the latch plate aperture 278 when the latching mechanism 256 is in the first position. The latch member 266 pivots at the bend on a pivot member 280. The pivot member 280 may be fixedly or rotatably coupled at its ends with the portion 260. In addition, the latching mechanism 256 includes a biasing member 282. In an embodiment, an end of the biasing member 282 is coupled with, and exerts a force on, the interior of the sliding member portion 260. Another end of the biasing member 282 is coupled with, and exerts a force on, the latch member second portion 270, whereby the latch member second portion 270 is biased such that the projection 274 engages the latch plate 276 aperture when the latching mechanism 256 is in a first, resting state, position.

In another embodiment, illustrated in FIG. 10, the latch plate 276 comprises side walls 276A and a tab 276B. Further, the latch plate 276 may be coupled with the top of the base member 202 via a pair of fasteners 284 partially disposed in the base member elongated aperture 206.

Disposed at an end of the sliding member 210 opposite the latching mechanism 256 is a slide-stop 286. As illustrated in FIG. 7, the slide-stop 286 may comprise a cylindrical member positioned through the side of the sliding member 210 and fixedly coupled thereto. Located at a predetermined position between the ends of the sliding member 210 is a stationary bracket 288. The stationary bracket 288 comprises a support portion 290 having bilateral legs 292. The bilateral legs 292 at least partially wrap around the sliding member 210 and are fixedly coupled to the sides thereof via a pair of fasteners through each leg.

The stationary bracket support portion 290 comprises a generally "L-shaped" geometry and includes an elongated aperture 294 therethrough disposed at an end of the support portion 290 opposite the bilateral legs 292. The elongated fastener aperture 294 permits a plurality of fasteners to be utilized therewith, such that the vertical position of the fasteners may be adjusted. In another embodiment, the elongated fastener aperture 294 may be replaced with a plurality of fastener apertures (not depicted) to permit vertical adjustment of a stationary bracket ladder grip 18-.

The stationary bracket ladder grip 296 is coupled with the support portion 290 via fasteners disposed through the elongated aperture 294. Similar to the ladder grip 244, the ladder grip 296 comprises a base portion 298 having a pair of fastener apertures therethrough. Extending from the base portion 298 are a pair of lateral extensions 299. As illustrated in FIGS. 6 and 7, in an embodiment, the lateral extensions 299 may be disposed the entire length of the base portion 298 and have a substantially S-shaped cross section geometry. However, persons having skill in the relevant arts will recognize that the lateral extensions 299 may comprise a shorter or longer length, and include any cross section geometry providing sufficient structural integrity to the lateral extensions 299.

As illustrated in FIGS. 5, 11, and 12, the ladder rack apparatus 100 includes a second arm 300. In an embodiment, the second arm 300 is non-fixedly mounted on the second cross member 114. In an embodiment, the second arm 300 includes a pair of secondary positive stops 304A, 304B that selectively contact the guide roller 126 support pin 128. When the ladder rack apparatus 100 transitions from a second position 102 to the first position 101, the secondary positive stop 304B slideably engages the guide roller 126 support pin in the second cross member 114. When the ladder rack apparatus 100 transitions from the first position 101 to the second position 102, the secondary positive stop 304A slideably engages the guide roller 126 support pin in the second cross member 114. In another embodiment, the second arm 300 may not comprise the secondary positive stop 304A.

The second arm 300 further comprises an elongated aperture 306 disposed through the top thereof, substantially parallel with the second arm 300 longitudinal axis. A bumper 308 is coupled with a first end of the second arm 300. The bumper 308 contacts the first-position positive stop 122 when the ladder rack apparatus 100 is in a first position 101. The bumper 308 extends beyond the first end of the second arm 300 and may be positioned such that a bumper surface 310 is not flush with the bottom of the second arm 300. The vertical position of the bumper 308 may be utilized to decrease a gap between the second cross member 114 and the second arm 300.

Housed in the interior of the second arm 300 is a linear actuation assembly 312. The linear acutation assembly 312 includes a lead screw 314 rotatably mounted within the second arm 300. In an embodiment, the lead screw 314 may comprise a substantially cylindrical geometry having a threaded portion at a first end. In another embodiment (not depicted), the lead screw 314 may be threaded its entire length. The lead screw 314 of the linear actuation assembly 312 may be shorter than the lead screw 222, because the linear actuation assembly 312 is utilized to adjust a second adjustable bracket 322 which is disposed adjacent an outboard end the second arm 300. Coupled with a second end of the lead screw 314 for rotation therewith, is a knob 318. The knob 318 may be disposed on the exterior of an outboard end of the second arm 300 so as to be capable of manual use by an operator, without the assistance of additional tools or equipment.

In an embodiment, a nut portion 316 of the linear actuation assembly 312 comprises internal threads engaged with threads of the lead screw 314. The nut portion 316 is slideably disposed within the interior of the second arm 300. Unitary with, or coupled to, the nut portion 316 is a flange portion 320 having a pair of fastener apertures. The flange portion 320 is disposed through the elongated aperture 306 of the second arm 300 and is coupled with the second adjustable bracket 322.

The second adjustable bracket 322 may be identical to the first adjustable bracket 232, and couple with the linear actuation assembly 312 in the same manner the first adjustable bracket 232 is coupled with the linear actuation assembly 220.

The position of the second adjustable bracket 322 may be changed by an operator rotating the knob 318 in either direction. Changing the position of the second adjustable bracket 322 permits an operator to customize the ladder rack apparatus 100 to specifically fit his/her ladder.

In an embodiment, the second adjustabel bracket 322 may be utilized in conjunction with a second stationary bracket 324. As illustrated in FIG. 3, in an embodiment, the second stationary bracket 324 is fixedly coupled with the second cross member 114.

The second stationary bracket 324 comprises a support portion 326 having a base 328 (see FIG. 3). The base 328 includes a pair of fastener apertures therethrough for coupling the base 328 to the second cross member 114. In an embodiment, located at an end of the support portion 326 opposite the end coupled with the second cross member 114 is an elongated fastener aperture (not depicted). The elongated fastener aperture permits a plurality of fasteners to be utilized therewith, such that the vertical position of the fasteners may be adjusted. In another embodiment, the elongated fastener aperture may be replaced with a plurality of fastener apertures (not depicted) to permit vertical adjustment the second stationary bracket 324.

The second stationary bracket 324 also includes a ladder grip 330 coupled with the support portion 326 via fasteners through the second stationary bracket support portion 326 elongated fastener aperture. The ladder grip 330 is substantially similar to the ladder grip 296 and as such is not described further herein.

As illustrated in FIG. 5, the ladder rack apparatus comprises a pivot drive assembly 400. The pivot drive assembly 400 comprises a pivot drive tube 402 rotatably disposed through both cross members 112, 114. A first end 404 and a second end 406 of the pivot drive tube 402 are each disposed in a bearing (not depicted) in the respective cross members 112, 114. In an embodiment (not depicted), the bearings may be replaced with a pair of bushings, or the first and second end 404, 406 of the pivot drive tube 402 may be rotatably supported in the first and second cross members 112, 114 without bearings or bushings. Fixedly coupled with the first end 404 of the pivot drive tube 402 is a handle arm 408.

The handle arm 408 is comprised of an elbow portion 410 coupled with a shaft portion 412 via a joint 414. The joint 414 permits the handle arm shaft 412 to rotate between a first position 416 and a second position 418. In the first position 416 (see FIG. 1) the handle arm shaft 412 is rotated inward so that an and thereof not coupled with the joint 414 is directed towards the second cross member 114 and is substantially parallel with the pivot drive tube 402. In the second position 418 the handle arm shaft 412 is rotated outward so that it is substantially parallel with the first cross member 112. In the first positiion 416 the handle arm shaft 412 is engaged with handle latch 420. The handle latch 420 is mounted on a side of the first cross member 112 with a number of fasteners. The handle latch 420 may be locked with a padlock or other securing device known in the art to prevent the unauthorized or undesired operation of the ladder rack apparatus 100. A handle grip (not depicted) may be coupled with the handle arm shaft 412.

As illustrated in FIG. 5, a first end of a second pivot arm 422 is fixedly-coupled with the pivot drive tube 402. A second end of the second pivot arm 422 is coupled with a rod 424. The rod 424 is also coupled with the second arm 300. The rod 424 allows rotation between the second pivot arm 422 and the second arm 300. Located between the first and second ends of the second pivot arm 422 is stop-flange 426. When the ladder rack apparatus 100 is in the second position 102, the stop-flange 426 contacts a second-position positive stop 428. The second-position positive stop 428 is disposed on the side of the second cross member 114 adjacent to the second pivot arm 422.

In the same manner, a first pivot arm 430 (see FIGS. 3 and 4) is coupled with the pivot drive tube 402 and a rod (not depicted), where the rod is coupled to the first arm base member 202 such that rotation may occur between the pivot arm 430 and and base member 202. Located between the first and second ends of the pivot arm 430 is a stop-flange 432. When the ladder rack apparatus 100 is in the second position 102, the stop-flange 432 contacts a second-position positive stop 434. The second-position positive stop 434 is disposed on the side of the first cross member 112 adjacent to the pivot arm 430.

Coupled with both the first arm 200 and the second arm 300 is a brace member 436. The brace member 436 may comprise cylindrical geometry and be coupled with the first arm 200 and the second arm 300 via brackets fastened thereto, or any known method. The brace member 436 is rigid and steadies the first and second arm 200, 300 to ensure they rotate to the second position 102 at substantially the same time.

In an embodiment, at least one gas spring (not depicted) may interconnect each of the cross member 112, 114 and a first arm 200 or a second arm 300. The gas spring may bias the first arm 200 and second arm 300 to the second position 102 of the ladder rack apparatus 100. In other embodiments, known biasing members be used instead of, or in conjunction with, the at least one gas spring.

In the first position 101 (see FIGS. 1 and 2) of the ladder rack apparatus 100, the ladder rack apparatus 100 is in a secured position for transport of the vehicle 10. To load a ladder 50 onto the ladder rack apparatus 100, the handle arm shaft 412 is rotated, i.e., extended, to the second position 418 (see FIGS. 3 and 5). The handle arm 408 is then rotated down such that the pivot drive tube 402 rotates and the first and second pivot arms 430, 422 drive the first arm 200 and the second arm 300 into the second ladder rack apparatus position 102, where the stop-flanges 426, 432 contact the second-position positive stops 428, 434 (see FIG. 3). The sliding member 210 of the first arm 200 is then extended, and the ladder rack apparatus 100 is in a third position 103. To extend the sliding member 210, the release handle 264 is actuated and the latching mechanism 256 is disengaged.

To load the ladder 50 into the ladder rack apparatus 100, a first end of a right rail 51 of the ladder 50 is supported on the second adjustable bracket 322. Then a second end of the ladder 50 is rested on the ground near a rear wheel of the vehicle 10. The ladder 50 is then pivoted on the second adjustable bracket 322 until the second end of an interior of a left rail 52 of the ladder 50 can be supported on the first adjustable bracket 232. The stationary handle 258 is then used to push the sliding member 210 into the second position 102, where the latching mechanism 256 is engaged. The handle arm 408 is then rotated such that the pivot drive tube 402 rotates and the pivot arms 422, 430 drive the first arm 200 and the second arm 300 into the ladder rack apparatus first position 101, where the bumpers 212, 308 contact the first-position positive stops 120, 122. Then, the first and second adjustable brackets 232, 322 may be adjusted by turning the knobs 224, 318.

Figure 18:
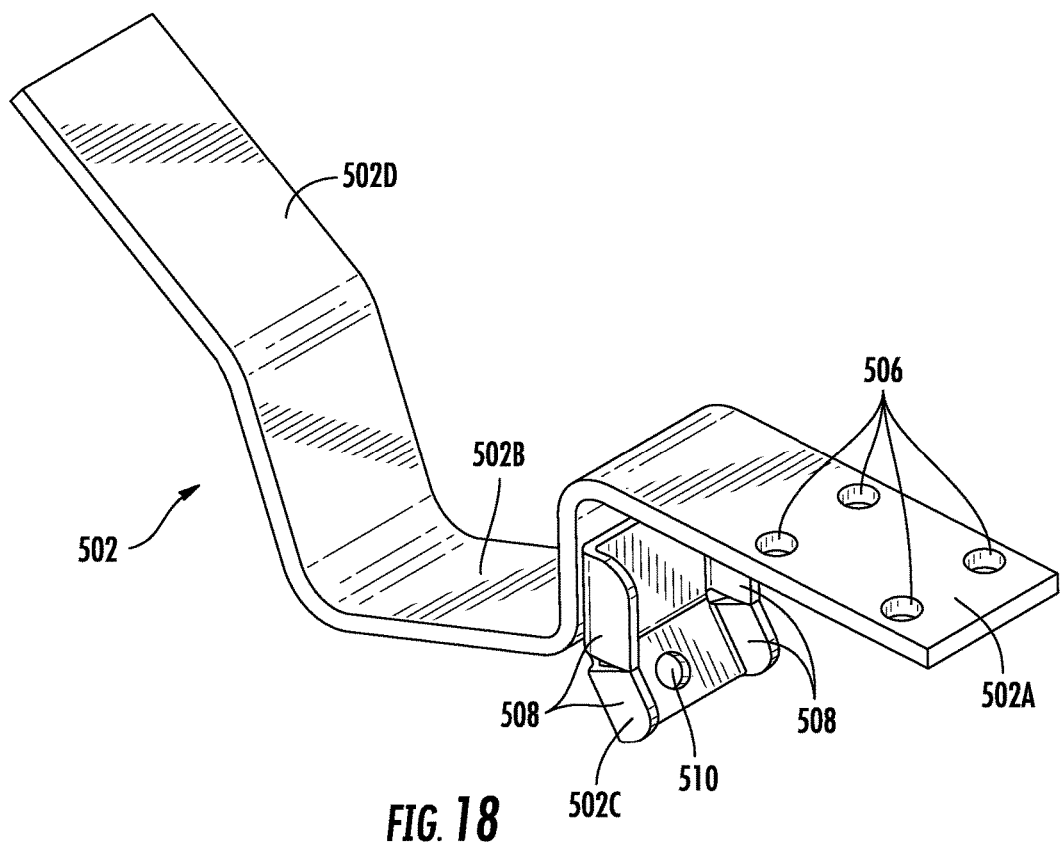
FIG. 18 illustrates a portion of the ladder rack apparatus of FIG. 15.
Figure 19:
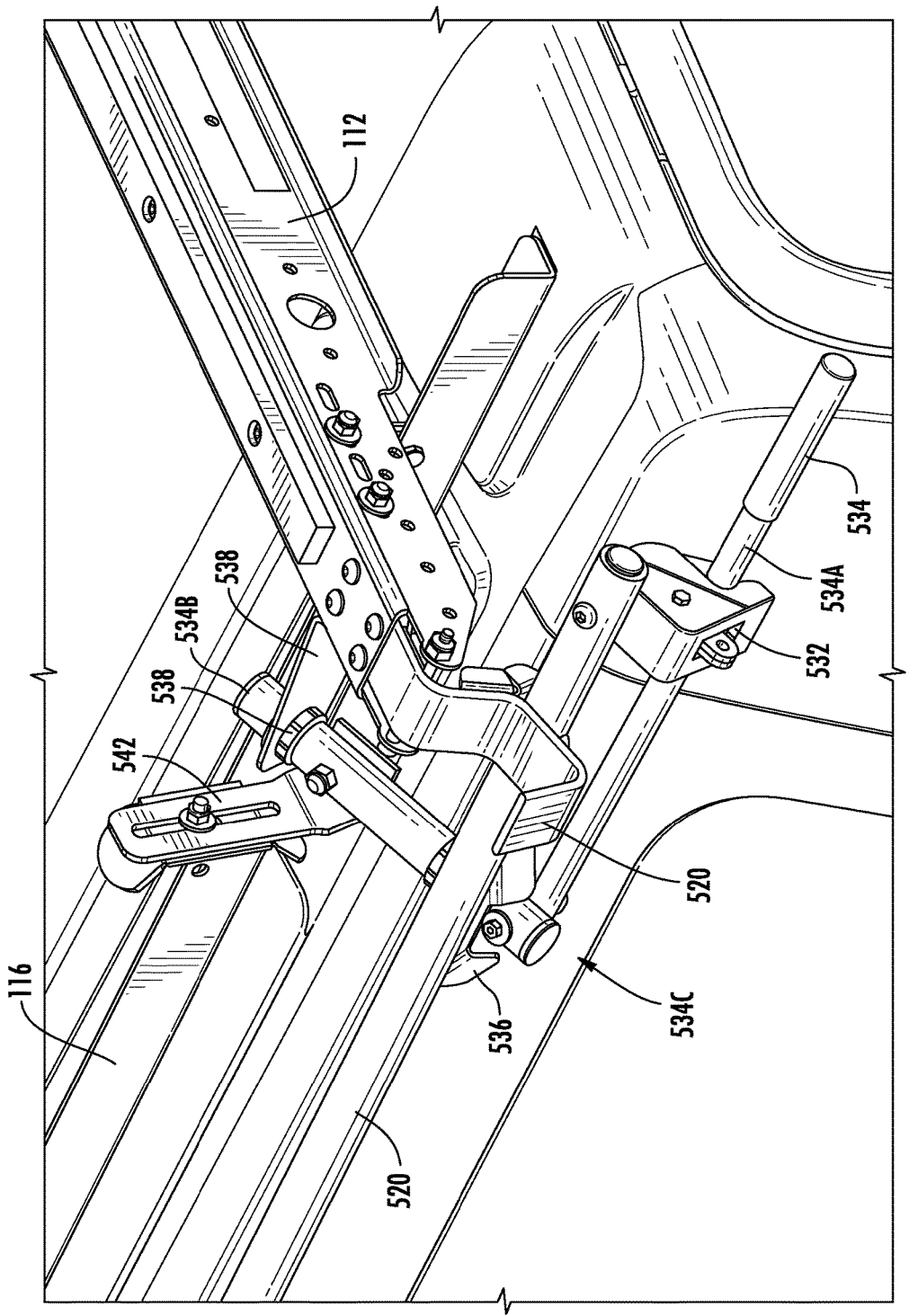
FIG. 19 illustrates another portion of the ladder rack apparatus of FIG. 15.
Figure 20:
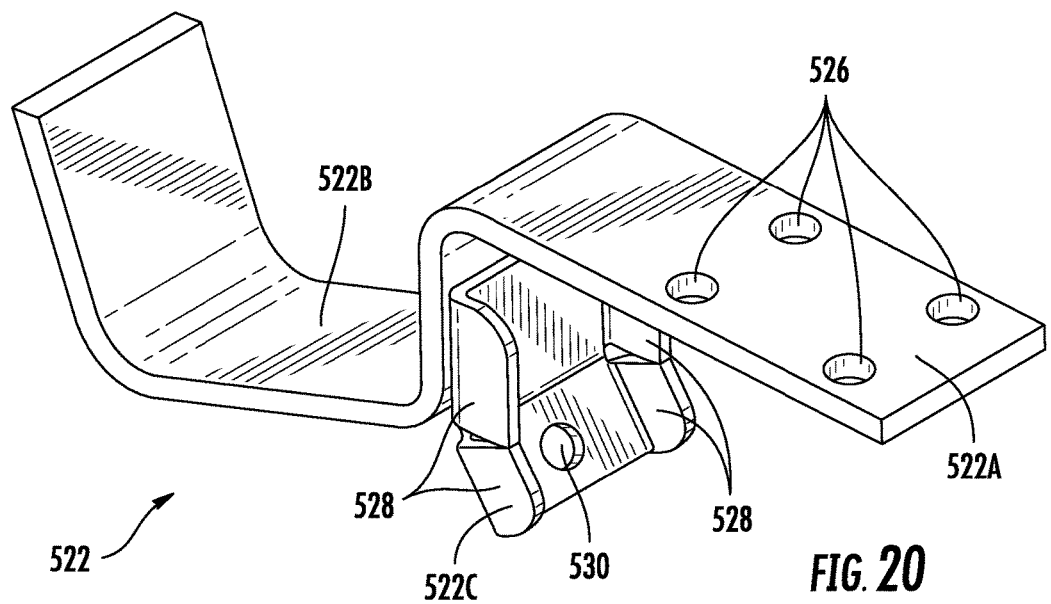
FIG. 20 illustrates a portion of the ladder rack apparatus of FIG. 19.
Figure 21:
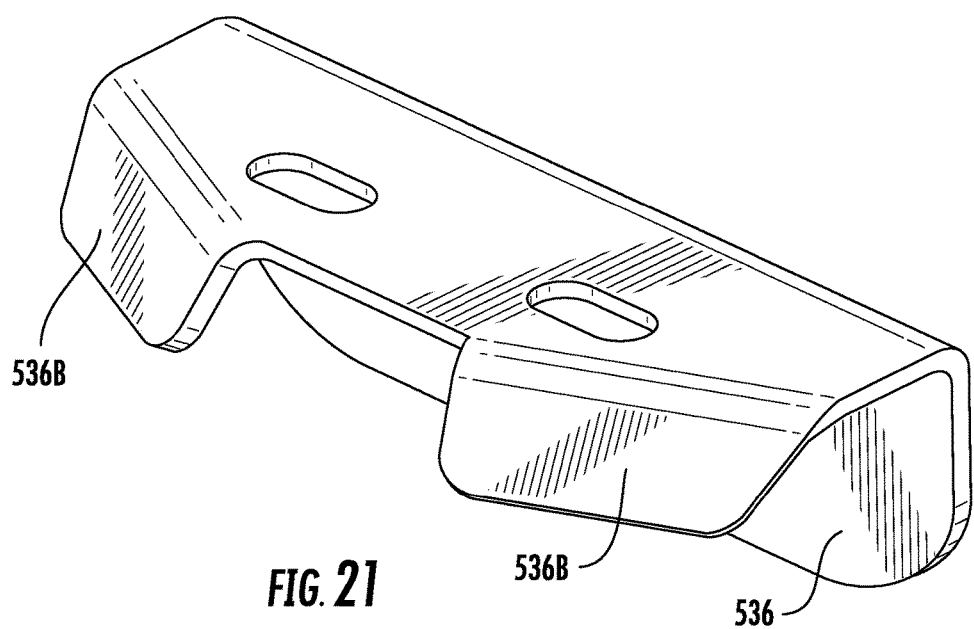
FIG. 21 illustrates a portion of the ladder rack apparatus of FIG. 19.
Figure 22:
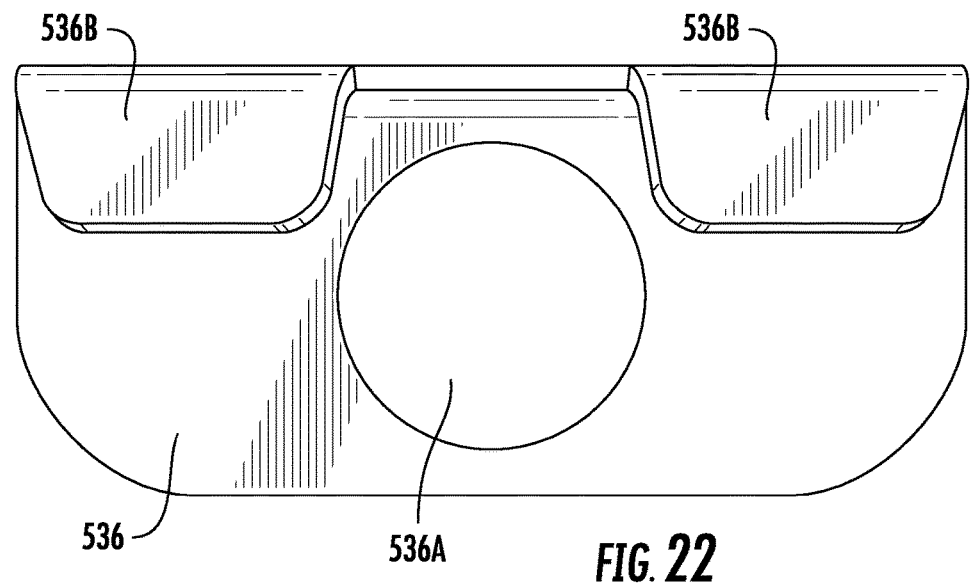
FIG. 22 illustrates a portion of the ladder rack apparatus of FIG. 19.
Figure 23:
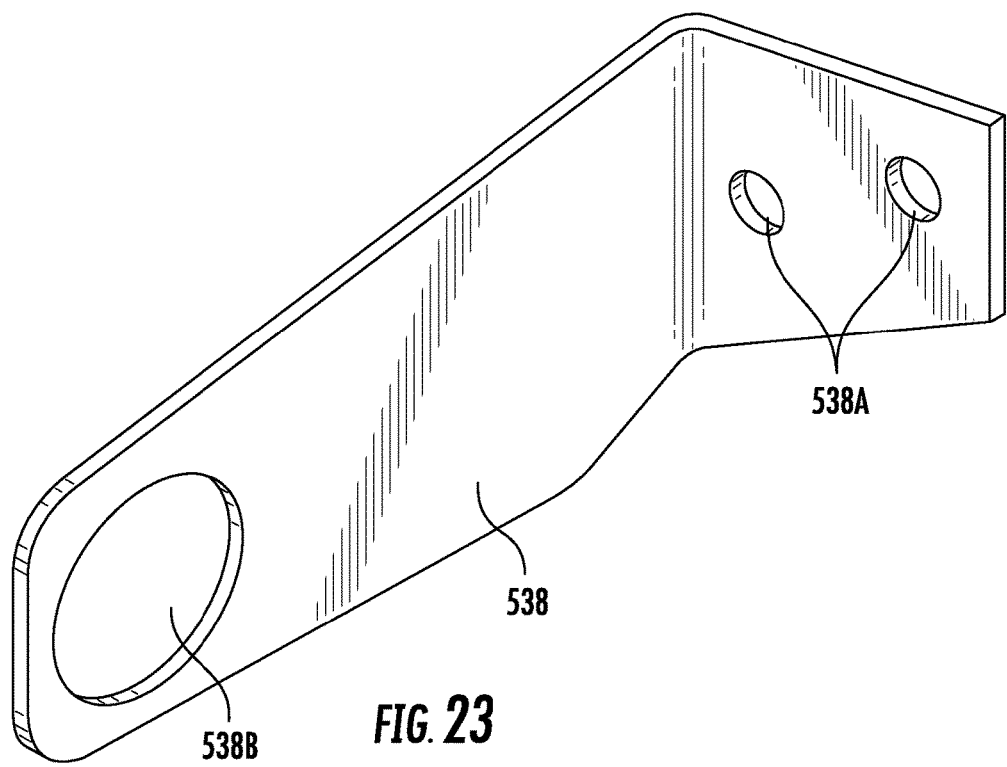
FIG. 23 illustrates a portion of the ladder rack apparatus of FIG. 19.
Figure 24:
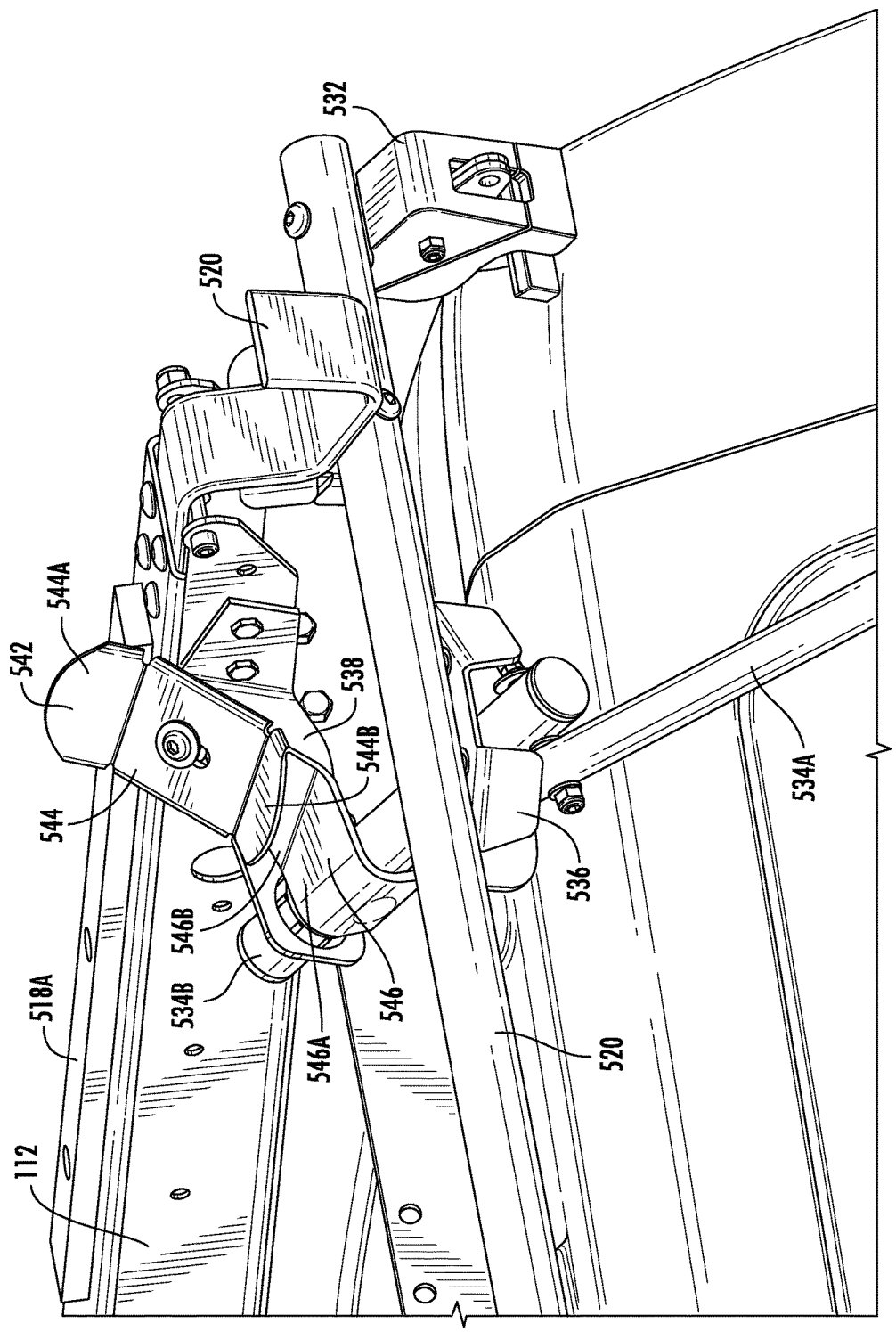
FIG. 24 illustrates another portion of the ladder rack apparatus of FIG. 15.

As illustrated in FIGS. 15-25, a grip lock ladder rack 500 may also be coupled with the frame assembly 110. The grip lock ladder rack 500 may be mounted on the ends of the first and second cross members 112, 114 opposite the first arm 200 and the second arm 300. The grip lock ladder rack 500 includes a first ladder support 502 and a second ladder support 504. As illustrated in FIG. 18, the first ladder support 502 comprises a mounting portion 502A having four fastener apertures 506 therethrough. The mounting portion 502A is coupled to the second cross member 114 via fasteners disposed through the fastener apertures 506. The first ladder support 502 also comprises a generally "U-shaped" bracket portion 502B. Coupled with the underside of the bracket portion 502B, between the bracket portion 502B and the mounting portion 502A, is a tube mounting 502C. The tube mounting 502C comprises an angled component having flanges 508 and a fastener aperture 510. The first ladder support 502 also comprises an extension portion 502D protruding from the bracket portion 502B at an angle, opposite of the end of the bracket portion 502B that is unitary with the mounting portion 502A.

A stationary rung bracket 512 is coupled with the second cross member 114 via at least one fastener. In an embodiment, the at least one fastener coupling the stationary rung bracket 512 with the second cross member 114 may extend through one of the first ladder support fastener apertures 506. The stationary rung bracket 512 includes a ladder rung grip 514 mounted to a stationary bracket mount 516 via at least one fastener. The ladder rung grip 514 comprises ends 514A, 514B angled towards each other to limit vertical movement of a ladder rung engaged therewith. Coupled with the top of the second cross member 114, adjacent to the stationary rung bracket 512, is a first wear strip 518B. In an embodiment, the first wear strip 518B is generally rectangular and comprised of a polymer material such as, but not limited to, ultra-high-molecular-weight polyethylene or nylon.

Coupled with the first ladder support tube mounting 502C is a support tube 520. The support tube 520 couples the first ladder support 502 with a second ladder support 522. The support tube 520 provides lateral stability to the first and second ladder supports 502, 522. The second ladder support 522 comprises a mounting portion 522A having four fastener apertures 526 disposed therethrough. The mounting portion 522A may be coupled to the first cross member 112 via fasteners disposed through the fastener apertures 526. The second ladder support 522 also comprises a generally "U-shaped" bracket portion 522B. Coupled with the underside of the bracket portion 522B, between the bracket portion 522B and the mounting portion 522A, is a tube mounting 522C. The second ladder support tube mounting 522C comprises a generally rectangular component defining an obtuse angle at a generally middle portion thereof. The tube mounting 522C may include four flanges 528. Two of the flanges 528 are disposed transverse to a plane defined by a first portion of the tube mounting 522C, and two of the flanges 528 are disposed transverse a plane defined by a second portion of the tube mounting 522C. A fastener aperture 530 is disposed through one portion of the tube mounting 522C. The support tube 520 is coupled with the tube mounting 522C via a fastener disposed through the tube mounting fastener aperture 530.

The support tube 520 may extend beyond the first and second ladder supports 502, 522. Coupled with an end of the support tube 520 which extends beyond the second ladder support 522 is a handle latch 532. The handle latch 532 secures a rotating handle 534 in a first position (see FIG. 19). The handle 534 comprises a handle shaft 534A coupled with a rotating shaft 534B via a pivot joint 534C. In an embodiment, the pivot joint 534C comprises coupling an end of the handle shaft 534A with an end of the rotating shaft 534B with a fastener such as, but not limited to, a bolt and nut. A handle pivot guard 536 is coupled with the support tube 520 via a pair of fasteners. The rotating shaft 534B is disposed through an aperture 536A in the handle pivot guard 536. The handle pivot guard 536 also comprises a pair of bilateral flanges 536B. The handle pivot guard 536 prevents the handle 534 from contacting the vehicle 10.

An end of the rotating shaft 534B, opposite to the end coupled with the pivot joint 534C, is disposed through an aperture 538B in a handle pivot bracket 538 for rotation therein. In an embodiment, a bushing 540 may be disposed in the handle pivot bracket 538 aperture 538B, whereby the bushing 540 is disposed coaxially about the rotating shaft 534B. The handle pivot bracket 538 is coupled with the first cross member 112 via a pair of fasteners disposed through fastener apertures 538A (see FIG. 23).

An actuating rung bracket 542 is coupled with the rotating shaft 534B. The actuating rung bracket 542 includes a ladder rung grip 544 coupled with a bracket mount 546 via at least one fastener. In order to facilitate secure engagement with a ladder rung, and avoid interference with a ladder rung support, the bracket mount 546 may comprise a first portion 546A coupled with the rotating shaft 534B, and a second portion 546B coupled with the ladder rung grip 544. The second portion 546B of the bracket mount 546 may be angled in relation to the bracket mount first portion 546A. In an embodiment, the first portion 546A and the second portion 546B may define an obtuse angle on an inboard edge of the bracket mount 546. In another embodiment, the first portion 546A and the second portion 546B may define an obtuse angle on an outbboard edge of the bracket mount 546.

The ladder rung grip 544 comprises ends 544A, 544B angled towards each other to limit vertical movement of an engaged ladder rung. When the handle 534 is rotated the actuating rung bracket 542 rotates with the rotating shaft 534B. Coupled with the top of the first cross member 112, adjacent to the actuating rung bracket 542, is a second wear strip 518A. In an embodiment, the second wear strip 518A is generally rectangular and comprised of a polymer material such as, but not limited to, ultra-high-molecular-weight polyethylene or nylon.

To load the ladder 50 onto the grip lock ladder rack 500, the handle shaft 534A is released from the handle latch 532 and rotated to a second position, i.e., extended. The handle shaft 534A is then rotated such that the rotating shaft 534B rotates and drives the actuating rung bracket 542 into a grip lock ladder rack 500 second position. A first end of a right rail 51 of the ladder 50 is supported on the second ladder support 504. Then a second end of the ladder 50 is rested on the ground near a front wheel of the vehicle 10. The ladder 50 is then pivoted on the second ladder support 504 until the second end of the ladder right rail 51 can be supported on the first ladder support 502. The handle shaft 534A is then rotated such that the rotating shaft 534B rotates and drives the actuating rung bracket 542 into a grip lock ladder rack 500 first position, whereby the actuating bracket 542 engages a rung of the ladder 50 and drives another rung of the ladder 50 into engagement with the stationary rung bracket 512. The handle shaft 534A is then secured in the handle latch 532, and the ladder 50 is secured in the grip lock ladder rack 500. The handle latch 532 may be secured with a pin, padlock, or other securement apparatus.

The grip lock ladder rack 500 may be utilized with the ladder rack apparatus 100. In another embodiment, both sides of the frame assembly 110 may have mounted thereon the ladder rack apparatus 100. In yet another embodiment, both sides of the frame assembly 110 may have mounted thereon the grip lock ladder rack 500.

While various embodiments of the presently disclosed subject matter have been described above, it should be understood that they have been presented by way of example, and not limitation. It will be apparent to persons skilled in the relevant art that the disclosed subject matter may be embodied in other specific forms without departing from the spirit or essential characteristics thereof. The embodiments described above are therefore to be considered in all respects as illustrative, not restrictive.

What is claimed is:
1. A vehicle equipment rack, comprising:
a first cross member;
a second cross member;
a first roller coupled with an outboard end of said first cross member;
a second roller coupled with an outboard end of said second cross member;
a first arm in rolling engagement with said first roller;
a second arm in rolling engagement with said second roller;
a drive tube rotatably coupled with said first and second cross members;
a first pivot arm coupled with said drive tube, said first pivot arm rotatably coupled with said first arm;
a second pivot arm coupled with said drive tube, said second pivot arm rotatably coupled with said second arm;
said first arm comprising:
a base member in rolling engagement with said first roller;
said base member having an aperture disposed through a surface thereof;
a first linear actuator disposed in said base member, wherein a portion of said first linear actuator is disposed through said base member aperture;
a first bracket disposed on a surface of said base member;
said first bracket coupled with said first linear actuator;
a sliding member slideably coupled with said base member;
a second bracket coupled with said sliding member;
said second arm comprising:
a third bracket disposed on a surface of said second arm; and
a fourth bracket coupled with said second arm.
2. The vehicle equipment rack according to claim 1, said second arm further comprising:
an aperture disposed through a surface thereof;
a second linear actuator disposed in said second arm, wherein a portion of said second linear actuator is disposed through said second arm aperture; and
said third bracket coupled with said second linear actuator.
3. The vehicle equipment rack according to claim 1, said first linear actuator further comprising:
a lead screw at least partially disposed in said base member;

a nut portion coupled with said lead screw; wherein said nut portion comprises a flange disposed through said base member aperture.

4. The vehicle equipment rack according to claim 3, said first linear actuator further comprising:
a first knob coupled with said lead screw; wherein rotation of said knob rotates said lead screw.

5. The vehicle equipment rack according to claim 1, said first bracket further comprising:
a support portion coupled with said first linear actuator, wherein said support portion includes an aperture therethrough; and
a first ladder grip coupled with said support portion via fasteners disposed through said aperture, wherein a vertical position of said first ladder grip is adjustable relative to said base member.

6. The vehicle equipment rack according to claim 1, said first arm further comprising:
a portion coupled with said sliding arm, wherein said portion projects at least partially into an interior portion of said sliding member; and
a stop coupled with said base member.

7. The vehicle equipment rack according to claim 1, wherein:
said first pivot arm comprises a flange projecting at least partially transverse a plane defined by said first pivot arm; and
a stop is disposed on a surface of said first cross member, wherein said surface faces said second cross member.

8. The vehicle equipment rack according to claim 1, wherein:
said second pivot arm comprises a flange projecting at least partially transverse a plane defined by said second pivot arm; and
a stop is disposed on a surface of said second cross member, wherein said surface faces said first cross member.

9. The vehicle equipment rack according to claim 1, wherein:
said first bracket selectively engages a first surface of a first ladder rail;
said second bracket selectively engages a second surface of said first ladder rail;
said third bracket selectively engages said first surface of said first ladder rail; and
said fourth bracket selectively engages a first surface of a second ladder rail.

10. The vehicle equipment rack according to claim 1, said first arm comprising:
a latch assembly including:
a first handle coupled with said sliding member;
a second handle disposed adjacent said first handle;
a latch member coupled with said second handle, wherein at least a portion of said member is disposed within said sliding member;
said latch member comprising a portion selectively engaged with an aperture defined by said base member;
wherein said latch member is disposed on a pivot shaft coupled with said sliding member; and
a biasing member disposed between said latch member and a surface of said sliding member.

11. A vehicle equipment rack, comprising:
a first cross member;
a second cross member;
a first ladder support coupled with an end of said first cross member;
a second ladder support coupled with an end of said second cross member;
a first bracket coupled with said first cross member, wherein said first bracket is disposed inboard of said first ladder support;
a support shaft coupled with said first ladder support and said second ladder support;
a handle assembly rotatably coupled with said support shaft and said second cross member; and
a second bracket coupled with said handle. assembly, wherein rotation of said handle assembly rotates said second bracket.

12. The vehicle equipment rack according to claim 11, said first ladder support further comprising:
a first mounting portion coupled with said first cross member via fasteners disposed therethrough;
a second mounting portion coupled with said support shaft; and
a bracket portion having an angled portion extending in an outboard direction.

13. The vehicle equipment rack according to claim 11, said handle assembly further comprising:
a first shaft coupled with a rotating shaft via a joint;
said rotating shaft disposed through a guard coupled with said support shaft;
said rotating shaft further disposed through a support bracket coupled with said second cross member;
said second bracket coupled with said rotating shaft for rotation therewith.

14. The vehicle equipment rack according to claim 11, further comprising:
a latch mechanism coupled with said support shaft, wherein said handle assembly is selectively secured by said latch mechanism.

* * * * *